(12) United States Patent
Jung

(10) Patent No.: US 12,705,680 B2
(45) Date of Patent: Aug. 11, 2026

(54) METHOD OF VERIFYING ORIGINATOR OR BENEFICIARY AND AN ELECTRONIC DEVICE PERFORMING THEREOF

(71) Applicant: Dunamu Inc., Seoul (KR)

(72) Inventor: Min Seok Jung, Seongnam-si (KR)

(73) Assignee: Dunamu Inc., Seoul (KR)

( * ) Notice: Subject to any disclaimer, the term of this patent is extended or adjusted under 35 U.S.C. 154(b) by 309 days.

(21) Appl. No.: 18/188,254

(22) Filed: Mar. 22, 2023

(65) Prior Publication Data

US 2023/0306542 A1 Sep. 28, 2023

(30) Foreign Application Priority Data

Mar. 24, 2022 (KR) ........................ 10-2022-0036951
Mar. 30, 2022 (KR) ........................ 10-2022-0039927
Oct. 21, 2022 (KR) ........................ 10-2022-0136091

(51) Int. Cl.
*G06Q 30/00* (2023.01)
*G06Q 50/18* (2012.01)

(52) U.S. Cl.
CPC .................................. *G06Q 50/186* (2013.01)

(58) Field of Classification Search
None
See application file for complete search history.

(56) References Cited

U.S. PATENT DOCUMENTS 11,455,632 B2 9/2022 Oh et al.
2014/0222690 A1 8/2014 Wilf et al.
2016/0342989 A1 11/2016 Davis
(Continued)

FOREIGN PATENT DOCUMENTS

JP 2013033408 A 2/2013
JP 2015225447 A 12/2015
(Continued)

OTHER PUBLICATIONS

Cross-blockchain decentralized asset transfer protocol for public blockchains. By: Monika; Bhatia, Rajesh. In: International Journal of Communication Systems, Apr. 2024. (Year: 2024).*
(Continued)

*Primary Examiner* — Matthew T Sittner
(74) *Attorney, Agent, or Firm* — Seed Intellectual Property Law Group LLP

(57) ABSTRACT

A method of verifying a beneficiary is provided. The method may include identifying information regarding transfer of a virtual asset including full name data of an originator, date of birth (DOB) data of the originator and a beneficiary virtual asset address, identifying a hash value set of a full name of the originator generated based on the full name data of the originator and a hash value set of a DOB of the originator generated based on the DOB data of the originator, transmitting, to a beneficiary server, a verification request message including the hash value set of the full name of the originator, the hash value set of the DOB of the originator and the beneficiary virtual asset address, and receiving, from the beneficiary server, a response message including verification result information regarding whether the originator matches the beneficiary, which is generated based on the verification request message.

14 Claims, 25 Drawing Sheets

(56) References Cited

U.S. PATENT DOCUMENTS

| | | | | |
|---|---|---|---|---|
| 2019/0073692 | A1* | 3/2019 | Saravanan | G06Q 30/0255 |
| 2019/0114611 | A1 | 4/2019 | Tripathi et al. | |
| 2019/0356481 | A1* | 11/2019 | Spector | H04L 9/3247 |
| 2020/0034834 | A1 | 1/2020 | Li et al. | |
| 2020/0193420 | A1* | 6/2020 | Vogel | G06Q 20/3829 |
| 2021/0110390 | A1* | 4/2021 | Janaudy | G06Q 20/4016 |
| 2021/0272107 | A1* | 9/2021 | Shen | G06Q 20/389 |
| 2021/0295956 | A1* | 9/2021 | Adhikari | G06F 16/1873 |
| 2021/0357927 | A1 | 11/2021 | Kita et al. | |
| 2022/0058646 | A1 | 2/2022 | Oh et al. | |
| 2022/0103366 | A1 | 3/2022 | Shubrook | |
| 2022/0391901 | A1* | 12/2022 | Park | H04L 63/0823 |
| 2023/0060447 | A1* | 3/2023 | Jayakumar | H04L 9/3247 |
| 2023/0088625 | A1 | 3/2023 | Yun | |
| 2023/0113422 | A1 | 4/2023 | Kim et al. | |
| 2023/0196346 | A1* | 6/2023 | Higgins | G06Q 20/3825<br>705/64 |
| 2023/0267452 | A1* | 8/2023 | Isogawa | G06Q 20/405<br>705/75 |

FOREIGN PATENT DOCUMENTS

| | | | |
|---|---|---|---|
| JP | 2016062556 | A | 4/2016 |
| JP | 2018519577 | A | 7/2018 |
| JP | 2023534764 | A | 8/2023 |
| KR | 20170142374 | A | 12/2017 |
| KR | 2019-0000461 | A | 1/2019 |
| KR | 20200005322 | A | 1/2020 |
| KR | 2021-0103227 | A | 8/2021 |
| KR | 10-2022-0025634 | A | 3/2022 |
| WO | WO 2020023850 | A1 | 1/2020 |
| WO | WO 2020201024 | A1 | 10/2020 |
| WO | WO 2021177639 | A1 | 9/2021 |
| WO | 2022045691 | A1 | 3/2022 |

OTHER PUBLICATIONS

Asset Management of Smart Grid Using Digital Twin Technology and Machine Learning Algorithms. By: Xiaotao Deng. In: Scalable Computing: Practice & Experience, Mar. 2025. (Year: 2025).*

Asset Management of Smart Grid Using Digital Twin Technology and Machine Learning Algorithms. By: Xiaotao Deng. Mar. 2025 (Year: 2025).*

V. Gatteschi, F. Lamberti, C. Demartini, C. Pranteda and V. SantamarÃ-a, “To Blockchain or Not to Blockchain: That Is the Question, ” in IT Professional, vol. 20, No. 2, pp. 62-74, Mar./Apr. 2018 (Year: 2018).*

Monika, Bhatia R. Cross-blockchain decentralized asset transfer protocol for public blockchains. Int J Commun Syst. 2023. (Year: 2023).*

* cited by examiner

FIG. 5A

Verification request message 500

Query parameter 510

POST https://${vasp-endpoint}/kyc/v1/verification?reqId=ef248e2a-bef0-406b-b731-002e89a32306

Coctent-Type: application/json
VASP-API-Key: abcdef12345
VASP-Counterparty-Code: UPBT001KR Header 520

Body 530

```
{
    "verificationType": "VerifyOriginator" ,
    "txId": "Ox7d9e62f65468caa7023967835c760913e881a6484498d1f021b46f9b26f07df9",
    "symbol": "ETH" ,
    "address": "Ox00192fblOdf37c9fb26829eb2cc623cdlbf5994h" ,
    "hashSalt": "83746be7-9908-4792-ab04-1bb3a4eb3328",
    "dobHash": "9096a390ba4339afe391119fb3d7788e1e3786bf95b12cc2581bc67fedbedc5b"
    "nameHashes": [
        "eeafa9b214eledbd3893694c396d6c630220075f4d1f9e98f6629f761d3fflfb",
        "c516fd8d055e8c2a78eb7bc22a9a49b37c1a208a991357b94a8bfc02c24cc728",
        "05ccl4cbcbbfl3fedaacb003188a28844436450c33e866aa0b88fe5e6a2a314a",
        "985ed8ecb74167df79f3c287a15a8825fbccef29448f6456112e14032e7c2bc9",
    ]
}
```

FIG. 5B

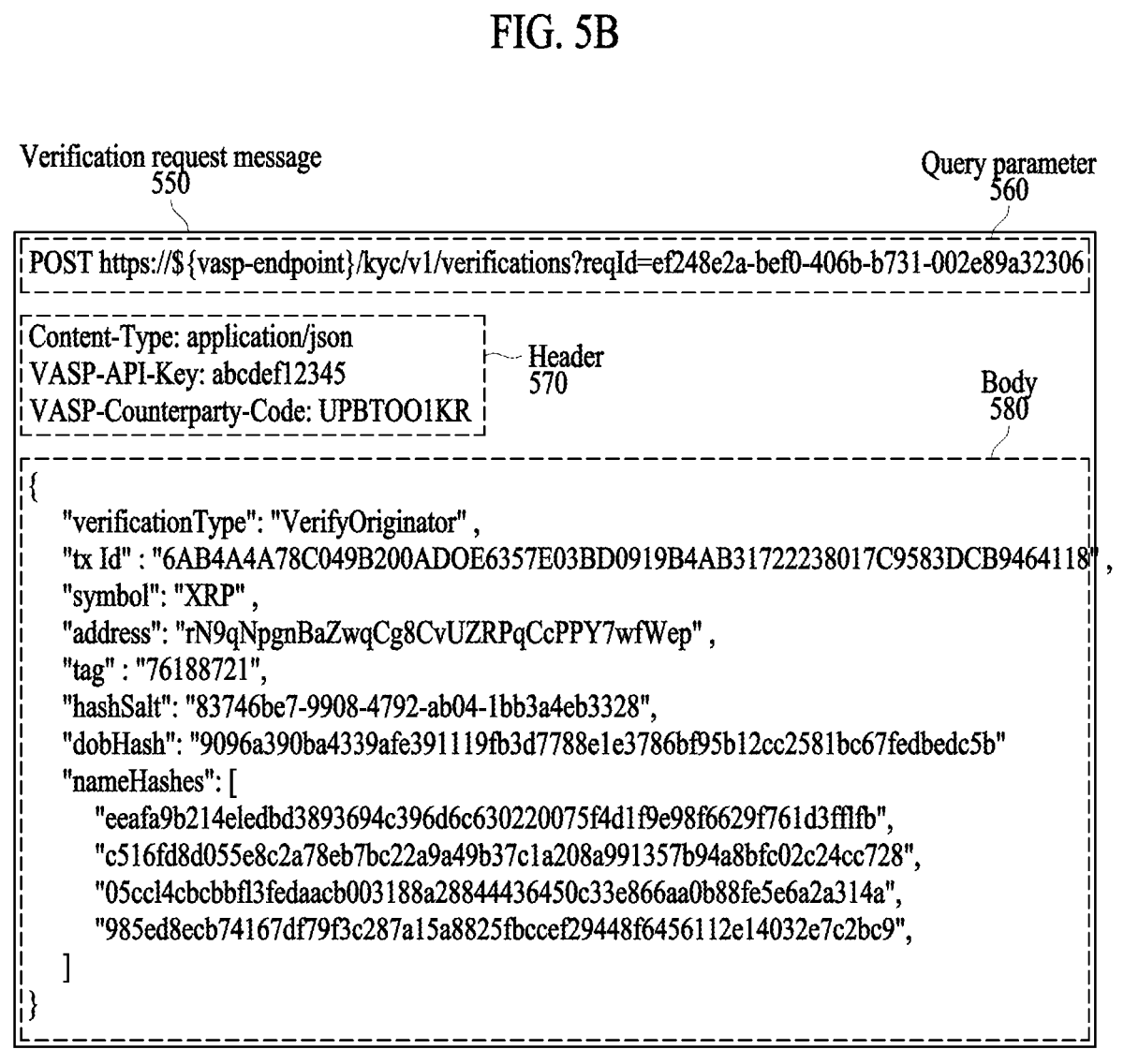

Verification request message 550

Query parameter 560

POST https://${vasp-endpoint}/kyc/v1/verifications?reqId=ef248e2a-bef0-406b-b731-002e89a32306

Content-Type: application/json
VASP-API-Key: abcdef12345
VASP-Counterparty-Code: UPBTOO1KR Header 570

Body 580

{
"verificationType": "VerifyOriginator" ,
"tx Id" : "6AB4A4A78C049B200ADOE6357E03BD0919B4AB31722238017C9583DCB9464118" ,
"symbol": "XRP" ,
"address": "rN9qNpgnBaZwqCg8CvUZRPqCcPPY7wfWep" ,
"tag" : "76188721",
"hashSalt": "83746be7-9908-4792-ab04-1bb3a4eb3328",
"dobHash": "9096a390ba4339afe391119fb3d7788e1e3786bf95b12cc2581bc67fedbedc5b"
"nameHashes": [
"eeafa9b214e1edbd3893694c396d6c630220075f4d1f9e98f6629f761d3ff1fb",
"c516fd8d055e8c2a78eb7bc22a9a49b37c1a208a991357b94a8bfc02c24cc728",
"05cc14cbcbbf13fedaacb003188a28844436450c33e866aa0b88fe5e6a2a314a",
"985ed8ecb74167df79f3c287a15a8825fbccef29448f64561 12e14032e7c2bc9",
]
}

FIG. 6

Response message 600

200 OK

Header 620

Content-Type: application/json

Body 640

{
    "verificationResult": "VERIFIED"
}

Originator

1. Hash value of full name
2. Hash value of DOB

Beneficiary

1. Hash value of full name
2. Hash value of DOB

Originator

1. Hash value set of name
- First hash value
- Second hash value
- Third hash value

⋮

2. Hash value of DOB

Beneficiary

1. Hash value of full name
2. Hash value of DOB

Originator

1. Hash value of full name
2. Hash value of DOB

Beneficiary

1. Hash value set of name
- First hash value
- Second hash value
- Third hash value

⋮

2. Hash value of DOB

Originator

1. Hash value set of name
- First hash value
- Second hash value
- Third hash value

⋮

2. Hash value of DOB

Beneficiary

1. Hash value set of name
- First hash value
- Second hash value
- Third hash value

⋮

2. Hash value of DOB

First beneficiary

1. Hash value of full name
2. Hash value of DOB

Second beneficiary

1. Hash value of full name
2. Hash value of DOB

First beneficiary

1. Hash value set of name
- First hash value
- Second hash value
- Third hash value

⋮

2. Hash value of DOB

Second beneficiary

1. Hash value of full name
2. Hash value of DOB

First beneficiary

1. Hash value of full name
2. Hash value of DOB

Second beneficiary

1. Hash value set of name
- First hash value
- Second hash value
- Third hash value

⋮

2. Hash value of DOB

First beneficiary

1. Hash value set of name
- First hash value
- Second hash value
- Third hash value

⋮

2. Hash value of DOB

Second beneficiary

1. Hash value set of name
- First hash value
- Second hash value
- Third hash value

⋮

2. Hash value of DOB

METHOD OF VERIFYING ORIGINATOR OR BENEFICIARY AND AN ELECTRONIC DEVICE PERFORMING THEREOF

CROSS-REFERENCE TO RELATED APPLICATION(S)

This application claims the benefit of Korean Patent Application No. 10-2022-0036951, filed on Mar. 24, 2022, Korean Patent Application No. 10-2022-0039927, filed on Mar. 30, 2022 and Korean Patent Application No. 10-2022-0136091, filed on Oct. 21, 2022, in the Korean Intellectual Property Office, the disclosure of which are incorporated herein by reference.

BACKGROUND

Technical Field

Example embodiments relate to a method for verifying an originator and/or a beneficiary in transferring virtual assets, and an electronic device performing the same.

Description of the Related Art

With the development of blockchain technology, virtual assets represented by Bitcoin are recognized as borderless assets, and the number of places where Bitcoin can be used (for example, offline stores and online stores) is also increasing. Virtual assets are sometimes exchanged with real assets, and their value fluctuates from time to time. Further, the types of virtual assets are also diversifying, and virtual asset service providers (VASPs) that act as agents for and manage virtual asset transactions are also increasing.

With regard thereto, prior art Korean Laid-open Patent Publication No. 10-2022-0025634 A may be referred to.

BRIEF SUMMARY

An aspect provides a method of verifying an originator and/or a beneficiary and an electronic device performing the same. More specifically, in transferring virtual assets, an aspect provides a method for verifying an originator and/or a beneficiary while complying with information provision obligations when transferring virtual assets and protecting personal information technically, and an electronic device performing the same.

The technical problems to be solved by the present disclosure are not limited to the technical problems described above, and other technical problems may be inferred from the following example embodiments.

According to an aspect, there is provided a method of verifying a beneficiary performed by an electronic device, including identifying information regarding transfer of a virtual asset including full name data of an originator, date of birth (DOB) data of the originator and a beneficiary virtual asset address, identifying a hash value set of a full name of the originator generated based on the full name data of the originator and a hash value set of a DOB of the originator generated based on the DOB data of the originator, transmitting, to a beneficiary server, a verification request message including the hash value set of the full name of the originator, the hash value set of the DOB of the originator and the beneficiary virtual asset address, and receiving, from the beneficiary server, a response message including verification result information regarding whether the originator matches the beneficiary, which is generated based on the verification request message, wherein, based on the verification result information, whether to transfer the virtual asset from an originating virtual asset address of the originator to the beneficiary virtual asset address is determined.

According to an example embodiment, the verification request message may further include at least one of a value representing a type of a verification target, a value representing a type of the virtual asset, an auxiliary virtual asset address according to the type of the virtual asset, or a hash salt value related to at least one of the hash value set of the full name of the originator or the hash value set of the DOB of the originator.

According to an example embodiment, the verification result information may include at least one of information indicating that an address matching the beneficiary virtual asset address or the auxiliary virtual asset address is not identified from among virtual asset addresses related to the beneficiary server, information regarding a mismatch between the hash value set of the full name of the originator and a hash value set of a full name of the beneficiary generated based on full name data of the beneficiary corresponding to the beneficiary virtual asset address, or information regarding a mismatch between the hash value set of the DOB of the originator and a hash value set of a DOB of the beneficiary generated based on DOB data of the beneficiary, or information indicating that the beneficiary is verified to match the originator.

According to an example embodiment, in case that the response message includes the information indicating that the beneficiary is verified to match the originator, it may be determined to perform the transfer of the virtual asset, and in case that the response message includes one from among the information indicating that an address matching the beneficiary virtual asset address or the auxiliary virtual asset address is not identified from among virtual asset addresses related to the beneficiary server, the information regarding the mismatch between the hash value set of the full name of the originator and the hash value set of the full name of the beneficiary generated based on the full name data of the beneficiary corresponding to the beneficiary virtual asset address or the information regarding the mismatch between the hash value set of the DOB of the originator and the hash value set of the DOB of the beneficiary generated based on the DOB data of the beneficiary, it may be determined to block the transfer of the virtual asset.

According to an example embodiment, the identifying of the hash value set of the full name of the originator and the hash value set of the DOB of the originator may comprise removing a space from the full name data of the originator.

According to an example embodiment, the identifying of the hash value set of the full name of the originator and the hash value set of the DOB of the originator may comprise changing a letter case of a character included in the full name data of the originator into a configured letter case.

According to an example embodiment, the hash value set of the full name of the originator may include at least one of a first hash value generated based on full name information of the originator consisting of a single entry in an order of first name and last name, a second hash value generated based on full name information of the originator consisting of a single entry in an order of the last name and the first name, or a third hash value generated based on full name information of the originator consisting of a plurality of entries including the last name, the first name and at least one of middle name.

According to an example embodiment, the verification result information may include, in case that any one hash value included in a hash value set of a full name of the beneficiary generated based on full name data of the beneficiary corresponding to the beneficiary virtual asset address does not match any one hash value of the first hash value, the second hash value and the third hash value, information regarding a mismatch between the hash value set of the full name of the originator and the hash value set of the full name of the beneficiary.

According to an example embodiment, the hash value set of the full name of the beneficiary generated based on the full name data of the beneficiary corresponding to the beneficiary virtual asset address may include at least one of a fourth hash value generated based on the full name information of the beneficiary consisting of a single entry in an order of first name and last name, a fifth hash value generated based on the full name information of the beneficiary consisting of a single entry in an order of the last name and the first name, or a sixth hash value generated based on full name information of the beneficiary consisting of a plurality of entries including the last name, the first name and at least one middle name.

According to an example embodiment, in case that any one hash value included in the hash value set of the full name of the originator does not match any one of the fourth hash value, the fifth hash value and the sixth hash value, the verification result information may include information regarding a mismatch between the hash value set of the full name of the originator and the hash value set of the full name of the beneficiary.

According to an example embodiment, with regard to the beneficiary virtual asset address, regardless of whether at least one character included in the beneficiary virtual asset address is a lowercase letter or an uppercase letter, it may be identified whether there is an address matching the beneficiary virtual asset address in database of the beneficiary server.

According to an example embodiment, with regard to the beneficiary virtual asset address, a configured prefix included in the beneficiary virtual asset address may be removed and it may be identified whether there is an address matching the beneficiary virtual asset address in database of the beneficiary server.

According to another aspect, there is provided a method of verifying an originator performed by an electronic device, including identifying a transferred virtual asset and a beneficiary virtual asset address, identifying full name data of a beneficiary corresponding to the beneficiary virtual asset address and DOB data of the beneficiary, identifying a hash value set of a full name of the beneficiary generated based on the full name data of the beneficiary and a hash value set of a DOB of the beneficiary generated based on the DOB data of the beneficiary, transmitting to an originating server, a verification request message including the hash value set of the full name of the beneficiary, the hash value set of the DOB of the beneficiary and the beneficiary virtual asset address, and receiving, from the originating server, a response message including verification result information regarding whether the beneficiary matches the originator, which is generated based on the verification request message.

According to an example embodiment, the verification request message may further include at least one among a transaction identification value corresponding to a transfer of the virtual asset, a value representing a type of a verification target, a value representing a type of the virtual asset, an auxiliary virtual asset address according to the type of the virtual asset, and a hash salt value related to at least one of the hash value set of the full name of the beneficiary or the hash value set of the DOB of the beneficiary.

According to an example embodiment, the verification result information may include at least one of information indicating that a value matching the transaction identification value is not identified from among transaction identification values related to the originating server, information indicating that an address matching the beneficiary virtual asset address or the auxiliary virtual asset address is not identified from among virtual asset addresses related to the originating server, information regarding a mismatch between the hash value set of the full name of the beneficiary and a hash value set of a full name of the originator generated based on full name data of the originator corresponding to the beneficiary virtual asset address or the transaction identification value, or information regarding a mismatch between the hash value set of the DOB of the beneficiary and a hash value set of a DOB of the originator generated based on DOB data of the originator, or information indicating that the originator is verified to match the beneficiary.

According to an example embodiment, the method may further include, in case that the verification result information includes the information indicating that the originator is verified to match the beneficiary, reflecting, based on the transaction identification value, the virtual asset to a balance of the beneficiary virtual asset address for each configured time.

According to an example embodiment, with regard to the transaction identification value, regardless of whether at least one character included in the transaction identification value is a lowercase letter or an uppercase letter, it may be identified whether there is a value matching the transaction identification value in database of the originating server.

According to an example embodiment, with regard to the transaction identification value, in case that a type of the transaction identification value includes an identifier type and a hash value type, it may be identified, using the transaction identification value of the hash value type, whether there is a value matching the transaction identification value in database of the originating server.

According to an example embodiment, with regard to the transaction identification value, it may be identified, using the transaction identification value including a value of leading zero, whether there is a value matching the transaction identification value in database of the originating server.

According to another aspect, there is provided an electronic device, including one or more processors and a memory for storing one or more instructions executed by the one or more processor, wherein the one or more processors, by executing the one or more instructions, are configured to identify information regarding transfer of a virtual asset including full name data of an originator, date of birth (DOB) data of the originator and a beneficiary virtual asset address, identify a hash value set of a full name of the originator generated based on the full name data of the originator and a hash value set of a DOB of the originator generated based on the DOB data of the originator, transmit, to a beneficiary server, a verification request message including the hash value set of the full name of the originator, the hash value set of the DOB of the originator and the beneficiary virtual asset address, and receive, from the beneficiary server, a response message including verification result information regarding whether the originator matches the beneficiary, which is generated based on the verification request message, wherein, based on the verification result information, whether to transfer the virtual asset from an originating virtual asset address of the originator to the beneficiary virtual asset address is determined.

According to another aspect, there is provided an electronic device, including one or more processors and a memory for storing one or more instructions executed by the one or more processor, wherein the one or more processors, by executing the one or more instructions, are configured to identify a transferred virtual asset and a beneficiary virtual asset address, identify full name data of a beneficiary corresponding to the beneficiary virtual asset address and DOB data of the beneficiary, identify a hash value set of a full name of the beneficiary generated based on the full name data of the beneficiary and a hash value set of a DOB of the beneficiary based on the DOB data of the beneficiary, transmit to an originating server, a verification request message including the hash value set of the full name of the beneficiary, the hash value set of the DOB of the beneficiary and the beneficiary virtual asset address, and receive, from the originating server, a response message including verification result information regarding whether the beneficiary matches the originator, which is generated based on the verification request message.

According to another aspect, there is provided a computer-readable non-transitory recording medium having a program to implement a method performed by an electronic device.

Additional aspects of example embodiments will be set forth in part in the description which follows and, in part, will be apparent from the description, or may be learned by practice of the disclosure.

According to example embodiments, in transferring virtual assets, it is possible to effectively verify an originator and/or a beneficiary while complying with information provision obligations when transferring virtual assets and protecting personal information technically. More specifically, as an originating VASP server and/or a beneficiary VASP server transmits hashed personal information (e.g., name or birth of date) rather than original personal information, the risk of exposing personal information of the originator and/or the beneficiary can be reduced. Moreover, whether the originator matches the beneficiary can be verified without transmitting personal information of the originator and/or the beneficiary.

According to example embodiments, since the virtual asset is transferred only when it is verified that the originator and the beneficiary match (e.g., the originator and the beneficiary are the same person), the safety and the reliability of the transfer of the virtual asset can be improved.

According to example embodiments, since the virtual asset is reflected to a balance of the beneficiary virtual asset address only when it is verified that the originator and the beneficiary match (e.g., the originator and the beneficiary are the same person), the safety and the reliability of the transfer of the virtual asset can be improved.

According to example embodiments, in the process of verifying an originator and/or a beneficiary, it is possible to technically block an unintentional mismatch that may occur due to the absence of standard naming rules that can reflect the reality of local full names in each country.

According to example embodiments, in the process of verifying an originator and/or a beneficiary, it is technically possible to block an unintentional mismatch that can happen in the absence of a standard name for a value or a symbol representing the type of virtual asset.

The technical benefits of the present disclosure is not limited thereto, and other technical benefits not described will be clearly understood by those skilled in the art from the description of the claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE SEVERAL VIEWS OF THE DRAWINGS

These and/or other aspects, features, and advantages of the disclosure will become apparent and more readily appreciated from the following description of example embodiments, taken in conjunction with the accompanying drawings of which:

FIGS. 5A and 5B illustrate examples of verification request messages according to example embodiments;

FIG. 6 illustrates an example of a response message according to an example embodiment;

DETAILED DESCRIPTION

Figure 1:
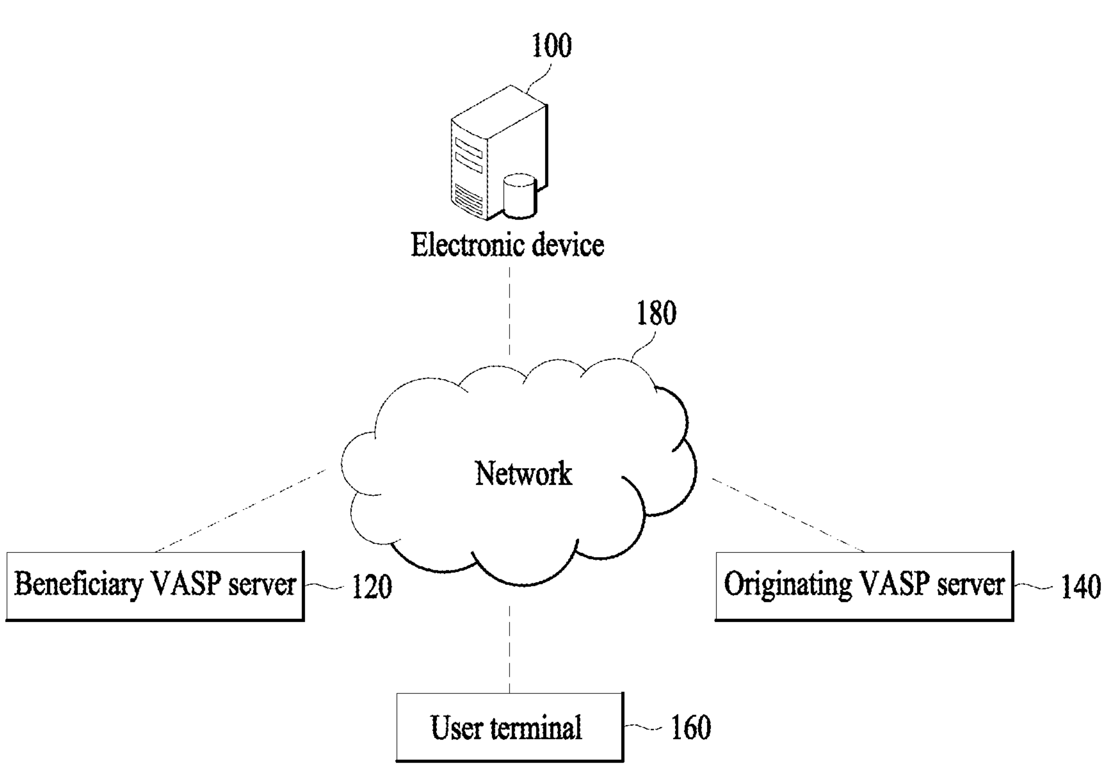
FIG. 1 illustrates a system according to an example embodiment.

Terms used in the example embodiments are selected from currently widely used general terms when possible while considering the functions in the present disclosure. However, the terms may vary depending on the intention or precedent of a person skilled in the art, the emergence of new technology, and the like. Further, in certain cases, there are also terms arbitrarily selected by the applicant, and in the cases, the meaning will be described in detail in the corresponding descriptions. Therefore, the terms used in the present disclosure should be defined based on the meaning of the terms and the contents of the present disclosure, rather than the simple names of the terms.

Throughout the specification, when a part is described as "comprising" or "including" or "having" a component, it does not exclude another component but may further include another component unless otherwise stated.

Expression "at least one of a, b and c" described throughout the specification may include "a alone," "b alone," "c alone," "a and b," "a and c," "b and c" or "all of a, b and c."

In the present disclosure, a "terminal" may be implemented as, for example, a computer or a portable terminal capable of accessing a server or another terminal through a network. Here, the computer may include, for example, a notebook, a desktop computer, and/or a laptop computer which are equipped with a web browser. The portable terminal may be a wireless communication device ensuring portability and mobility, and include (but is not limited to) any type of handheld wireless communication device, for example, a tablet PC, a smartphone, a communication-based terminal such as international mobile telecommunication (IMT), code division multiple access (CDMA), W-code division multiple access (W-CDMA), long term evolution (LTE), or the like.

Hereinafter, example embodiments will be described in detail with reference to the accompanying drawings so that those of skilled in the art to which the present disclosure pertains may easily practice the present disclosure. However, the example embodiments in the present disclosure may be implemented in many different forms and are not limited to the example embodiments described herein.

In the present disclosure, a virtual asset is an electronic token that has economic value and may be electronically traded or transferred, or may indicate rights related thereto. However, a virtual asset may be referred to as a digital asset, digital currency, virtual currency, or cryptocurrency, but it is not limited thereto.

In the present disclosure, a VASP indicates a person and or an entity who conducts business in any of the following 1) to 6) in relation to virtual assets:

1) an act of buying or selling virtual assets;
2) an act of exchanging a virtual asset for another virtual asset;
3) an act prescribed by Presidential Decree among acts of transferring virtual assets;
4) an act of storing or managing virtual assets;
5) an act of brokering or arranging, or acting as an agent for the acts of 1) and 2); and
6) other acts prescribed by Presidential Decree that are highly likely to be used for money laundering and public intimidation financing in relation to virtual assets.

However, acts that VASPs can perform in business related to virtual assets are not limited thereto.

In the present disclosure, a virtual asset address refers to a unique identification number generated electronically to manage transmission records and storage details of virtual assets.

However, the virtual asset address may be referred to as a wallet address, an electronic wallet address or a virtual asset wallet address, and it is not limited thereto.

In the present disclosure, an auxiliary virtual asset address is a unique identification code to distinguish a user's account, and the existence of an auxiliary virtual asset address may differ depending on the type of the virtual asset. In other words, the auxiliary virtual asset address may be used to distinguish different virtual asset types for the same user's account. For example, depending on the type of virtual asset owned by the user, one or more auxiliary virtual asset addresses corresponding to one account of the user may exist. However, the auxiliary virtual asset address may be referred to as a secondary address, a destination tag, a tag, a memo or a message, and the auxiliary virtual asset address is not limited thereto.

Hereinafter, example embodiments of the present disclosure will be described in detail with reference to the drawings.

FIG. 1 illustrates a system according to an example embodiment.

Referring to FIG. 1, the system may include at least one of an electronic device 100, a beneficiary VASP server 120, a remittance VASP server 140, a user terminal 160 or a network 180. Meanwhile, in the system illustrated in FIG. 1, only elements related to the example embodiments of the present disclosure are illustrated. Therefore, those skilled in the art may understand that other general-purpose elements may be further included in addition to the elements illustrated in FIG. 1.

The electronic device 100 may serve as an intermediary in verifying an originator transferring virtual assets or a beneficiary receiving virtual assets. For example, the electronic device 100 may transmit a verification request message including a hash value of a full name, a hash value of a BOD, and a beneficiary virtual asset address to the beneficiary VASP server 120 or the originating VASP server 140. Alternatively, the electronic device 100 may receive a response message including verification result information generated based on the verification request message from the beneficiary VASP server 120 or the originating VASP server 140, and may transmit the response message to the originating VASP server 140 or the beneficiary VASP server 120.

Further, the electronic device 100 may include at least one of an enclave server existing inside the VASP or an application programming interface (API) server existing outside the VASP. Alternatively, the electronic device 100 may include an integrated server existing inside the VASP, but it is not limited thereto. Alternatively, the electronic device 100 may be implemented as a single entity combined with either the beneficiary VASP server 120 or the originating VASP server 140.

The beneficiary VASP server 120 is a server that exists inside the beneficiary VASP, and the beneficiary VASP server 120 may provide users with services related to selling, buying or transferring virtual assets. For example, in relation to the service of transferring the virtual asset, the beneficiary VASP server 120 may transmit a verification request for the originator to the electronic device 100, or may transmit a beneficiary verification result to the electronic device 100.

The originating VASP server 140 is a server that exists inside the originating VASP, and the originating VASP server 140 may provide a user with a service related to selling, buying or transferring virtual assets. For example, in relation to the service of transferring the virtual asset, the originating VASP server 140 may transmit a verification request for a beneficiary to the electronic device 100 or transmit a verification result for an originator to the electronic device 100.

However, the beneficiary VASP server 120 may represent a server or an entity that exists separately outside the beneficiary VASP, and the originating VASP server 140 may represent a server or an entity that exists separately outside the originating VASP.

The user terminal 160 is a terminal used by each user, and users may access a beneficiary VASP or a service provided by the beneficiary VASP through the network 180, using each user terminal 160. For example, users may sell, buy or transfer virtual assets using an application installed on their respective user terminals 160.

The electronic device 100, the beneficiary VASP server 120, the originating VASP server 140 and the user terminal 160 may communicate with each other within the network 180. The network 180 includes a local area network (LAN), a wide area network (WAN), a value added network (VAN), a mobile radio communication network, a satellite communication network, and combination thereof. The network is a data communication network in a comprehensive sense that enables each network constituent entity shown in FIG. 1 to communicate smoothly with each other, and may include a wired Internet, a wireless Internet, and a mobile wireless communication network. Wireless communication is, for example, wireless LAN (Wi-Fi), Bluetooth, Bluetooth low energy, Zigbee, WFD (Wi-Fi Direct), ultra wideband (UWB), infrared data association (IrDA), and near field communication (NFC), etc., but it is not limited thereto.

Figure 2A:
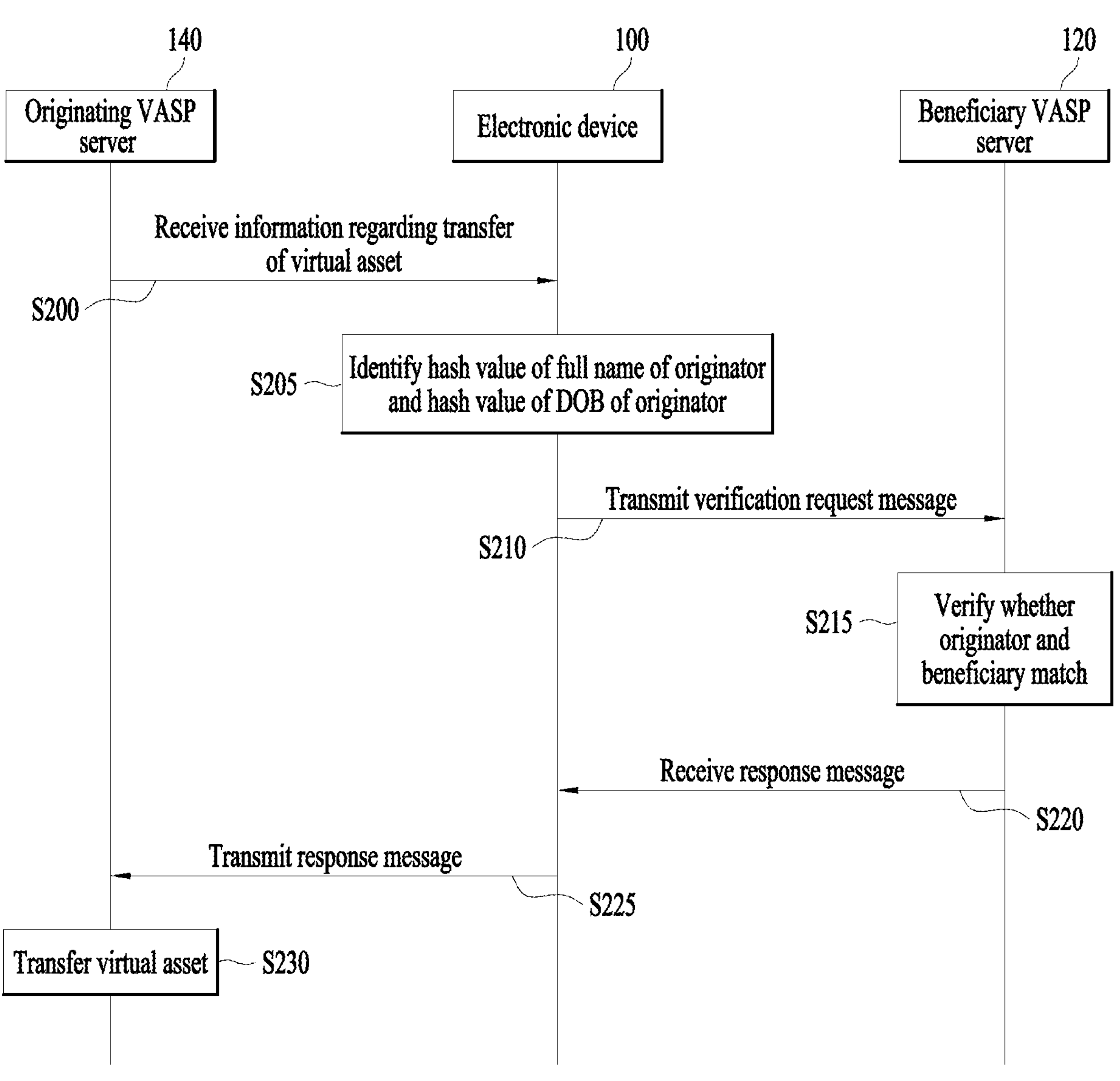
FIGS. 2A and 2B are flowcharts for explaining a process of verifying a beneficiary or an originator by an electronic device according to an example embodiment.
Figure 2B:
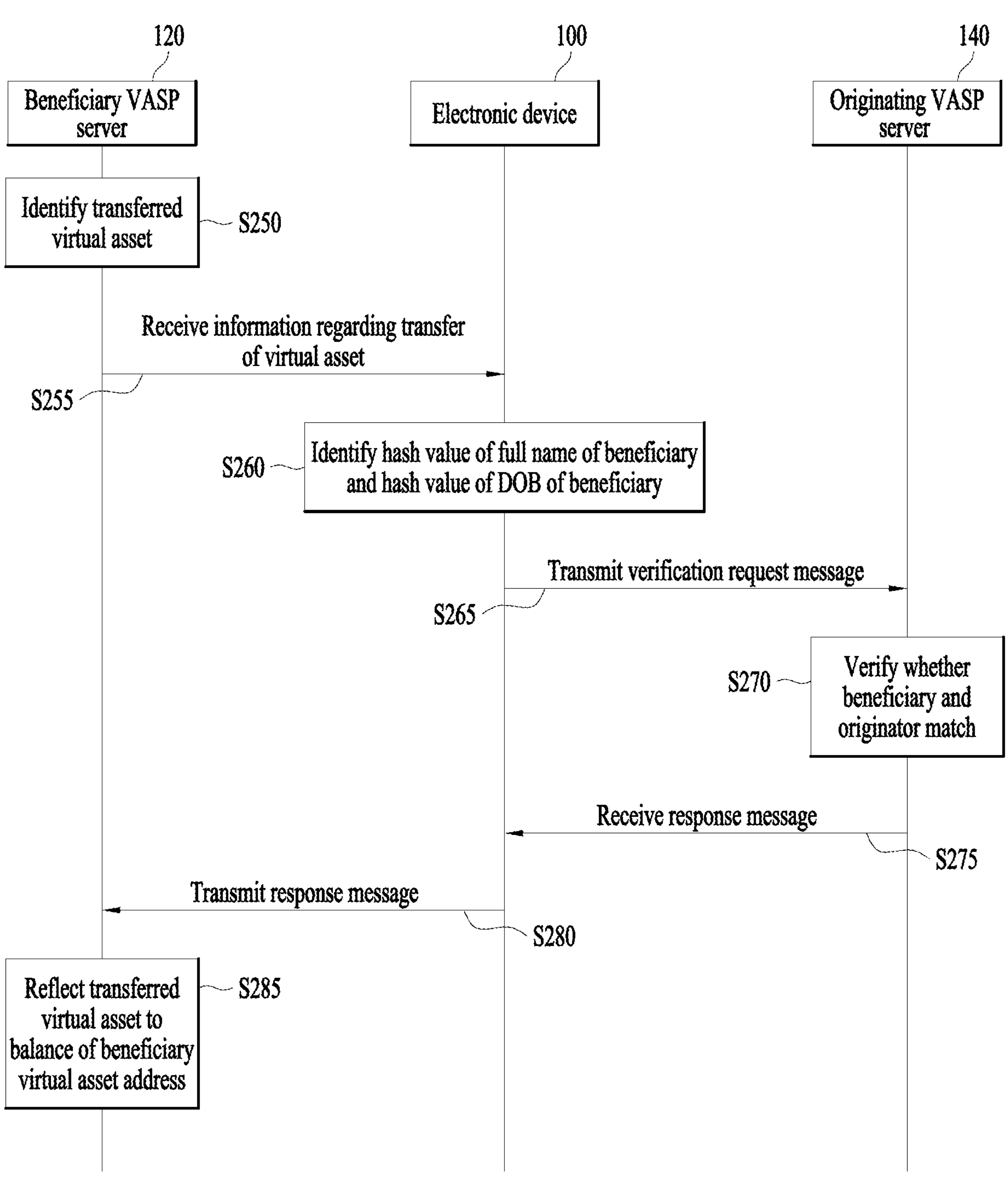

FIGS. 2A and 2B are flowcharts for explaining a process of verifying a beneficiary or an originator by the electronic device 100 according to an example embodiment.

According to the example embodiment, a user may transfer a virtual asset in his/her wallet managed by the originating VASP to the user's wallet managed by the beneficiary VASP using the user terminal 160. In other words, an account of the originating VASP (for example, an account of an originator) transferring a virtual asset and an account of the beneficiary VASP (for example, an account of a beneficiary) receiving the virtual asset may correspond to the same person.

FIG. 2A illustrates a process in which the electronic device 100 verifies the beneficiary according to the example embodiment. Here, the electronic device 100 may refer to a server existing inside the originating VASP. For example, the electronic device 100 may be implemented as an entity physically coupled with the originating VASP server 140 inside the originating VASP. In this case, the electronic device 100 and the originating VASP server 140 may be functionally or logically separated. For another example, the electronic device 100 and the originating VASP server 140 exist inside the originating VASP, but may be implemented as physically distinct entities as well as functionally or logically distinct.

In operation S200, the electronic device 100 may receive information regarding a transfer of a virtual asset from the originating VASP server 140 according to the example embodiment. For example, from the user terminal 160, the originating VASP server 140 may receive at least some of a value representing a type of virtual asset that the user wishes to transfer, information regarding a beneficiary VASP and a beneficiary virtual asset address. Thereafter, the originating VASP server 140 may transmit to the electronic device 100 at least some of a value representing the type of virtual asset, information regarding the beneficiary VASP, the beneficiary virtual asset address, full name data of the originator and DOB data of the originator. Here, the originating VASP server 140 may transmit an auxiliary virtual asset address to the electronic device 100 according to the type of the virtual asset.

In operation S205, according to an example embodiment, the electronic device 100 may identify a hash value of the full name of the originator and a hash value of the DOB of the originator. For example, the electronic device 100 may generate a hash value of the full name of the originator and a hash value of the DOB of the originator, by hashing each of the full name data of the originator and the DOB data of the originator received from the originating VASP server 140. Here, the electronic device 100 may use KECCAK-256 algorithm as a hash function or a hash algorithm, but a used hash algorithm is not limited thereto.

Further, identifying, by the electronic device 100, the hash value of the full name of the originator and the hash value of the DOB of the originator may be identifying the hash value of the full name of the originator and the hash value of the DOB of the originator, or obtaining the hash value of the full name of the originator and the hash value of the DOB of the originator.

According to an example embodiment, the electronic device 100 may generate a hash value set of the full name of the originator including one or more hash values of the full name of the originator by hashing the full name data of the originator. For example, the electronic device 100 may generate a hash value by hashing full name information of the originator composed of a single entry in the order of first name and last name, or generate a hash value by hashing full name information of the originator consisting of a single entry in the order of last name and first name. Alternatively, the electronic device 100 may generate a hash value by hashing the full name of the originator in Korean, or a hash value by hashing a full name of the originator in English. Detailed descriptions regarding thereto will follow with reference to FIGS. 7A to 7D.

In operation S210, the electronic device 100 may transmit a verification request message to the beneficiary VASP server 120 according to the example embodiment. For example, to the beneficiary VASP server 120, the electronic device 100 may transmit a verification request message including at least some of an identification value of the verification request message, a value representing the type of a verification target, a value representing the type of virtual asset, information regarding originating VASP, a beneficiary virtual asset address, a hash value of full name of the originator, a hash value of DOB of the originator and a hash salt value. Here, the electronic device 100 may also transmit an auxiliary virtual asset address to the beneficiary VASP server 120 according to the type of virtual asset. Details of values included in the verification request message will be described in detail with reference to FIGS. 5A and 5B.

In operation S215, according to the example embodiment, the beneficiary VASP server 120 may verify whether the originator and the beneficiary match. Meanwhile, the case that the originator and the beneficiary match may include a case where the originator and the beneficiary are the same person.

For example, the beneficiary VASP server 120 may identify full name data of the beneficiary and DOB data of the beneficiary corresponding to the beneficiary virtual asset address, may hash each of the full name data of the beneficiary and the DOB data of the beneficiary, and may generate a hash value of the full name of the beneficiary and a hash value of the DOB of the beneficiary. Here, the beneficiary VASP server 120 may identify whether the hash value of the full name of the originator received from the electronic device 100 matches the hash value of the full name of the beneficiary, and may identify whether the hash value of the DOB of the originator received from the electronic device 100 matches the hash value of the DOB of the beneficiary.

According to an example embodiment, the beneficiary VASP server 120 may identify whether there is an address matching a beneficiary virtual asset address or an auxiliary virtual asset address. For example, the beneficiary VASP server 120 may identify whether an address identical to the beneficiary virtual asset address received from the electronic device 100 exists in the database. Alternatively, if the beneficiary VASP server 120 also receives an auxiliary virtual asset address from the electronic device 100, the beneficiary VASP server 120 may identify whether an address matching the beneficiary virtual asset address and the auxiliary virtual asset address exists in the database.

According to an example embodiment, regardless of at least one character included in the beneficiary virtual asset address or the auxiliary virtual asset address is a lowercase letter or an uppercase letter, the beneficiary VASP server 120 may identify whether there is an address matching the beneficiary virtual asset address or the auxiliary virtual asset address. Accordingly, an unintentional mismatch that can be caused by distinguishing between an uppercase letter and a lowercase letter may be prevented.

According to an example embodiment, the beneficiary VASP server 120 may remove a configured prefix included in the beneficiary virtual asset address, and may identify whether there is an address matching the beneficiary virtual asset address. For example, the beneficiary VASP server 120 may remove prefixes such as "bitcoincash" and "ecash" included in the beneficiary virtual asset address, and may identify whether there is an address matching the beneficiary virtual asset address. Accordingly, may be prevented an unintended mismatch between a VASP that stores a beneficiary virtual asset address after removing a prefix according to the VASP's policy and a VASP that stores a beneficiary virtual asset address including a prefix according to the VASP's policy.

According to an example embodiment, the beneficiary VASP server 120 may identify full name data of the beneficiary and DOB data of the beneficiary. For example, if it is identified that an address matching the beneficiary virtual asset address received from the electronic device 100 exists in the database, the beneficiary VASP server 120 may identify full name data of the beneficiary and DOB data of the beneficiary corresponding to the beneficiary virtual asset address.

According to an example embodiment, the beneficiary VASP server 120 may identify whether the hash value of one or more names of the originator matches the hash value of one or more names of the beneficiary. For example, the beneficiary VASP server 120 may receive a hash value of a full name of one originator from the electronic device 100, and may identify whether the hash value of one full name of the originator matches the hash value of one full name of the beneficiary. Alternatively, the beneficiary VASP server 120 may receive a hash value set of the full name of the originator including hash values of one or more full names of the originator from the electronic device 100, and may identify whether a hash value of one full name of the beneficiary matches any one of hash values of one or more full names of the originator. The beneficiary VASP server 120 may receive a hash value of a full name of one originator from the electronic device 100, and may identify whether the hash value of one full name of the originator matches any one of the hash values of one or more full names of the beneficiary. Detailed descriptions regarding thereto will follow with reference to FIGS. 7A to 7D.

According to an example embodiment, the method of verifying a beneficiary may be performed based on hash values of information other than the DOB. For example, the electronic device 100 may identify a hash value of the mobile phone number of the originator generated based on the mobile phone number data of the originator, and the beneficiary VASP server 120 may identify whether the mobile phone number of the beneficiary matches the hash value. However, the type of information that can be used to verify a beneficiary is not limited thereto.

According to an example embodiment, the beneficiary VASP server 120 may verify whether the originator matches the beneficiary regardless of the type of the virtual asset. For example, if the value representing the type of virtual asset included in the verification request message is LUNA2 and if the type of virtual asset held by the beneficiary VASP server 120 is LUNA, a value matching LUNA2 may not exist. In this case, the beneficiary VASP server 120 may skip a process of identifying whether there is a value identical to the value representing the type of virtual asset, and may verify whether the originator and the beneficiary match. Accordingly, an unintended mismatch that can arise from the absence of standard naming rules for a value or a symbol representing the type of virtual asset may be prevented.

In operation S220, the electronic device 100 may receive a response message including verification result information generated based on the verification request message from the beneficiary VASP server 120 according to the example embodiment. For example, from the beneficiary VASP server 120, the electronic device 100 may receive a response message including at least some of information indicating that an address matching the beneficiary virtual asset address or the auxiliary virtual asset address is not identified, information regarding the mismatch between the hash value of the full name of the originator and the hash value of the full name of the beneficiary, information regarding the mismatch between the hash value of the DOB of the originator and the hash value of the DOB of the beneficiary, and information indicating that the beneficiary is verified to match the originator. This will be described in detail with reference to FIG. 6.

In operation S225, the electronic device 100 may transmit the response message to the originating VASP server 140 according to the example embodiment. For example, the electronic device 100 may transmit the response message received from the beneficiary VASP server 120 to the originating VASP 140.

In operation S230, the originating VASP server 140 may transfer the virtual asset to the beneficiary virtual asset address based on the verification result information included in the received response message. For example, if the response message received from the electronic device 100 includes information indicating that the beneficiary is verified to match the originator, the originating VASP server 140 may transfer the virtual asset to the beneficiary virtual asset address according to the information received from the user terminal 160. Alternatively, if the response message received from the electronic device 100 includes information (for example, at least some of the information indicating that an address matching the beneficiary virtual asset address or the auxiliary virtual asset address is not identified, the information regarding the mismatch between the hash value of the full name of the originator and the hash value of the full name of the beneficiary, and the information regarding the mismatch between the hash value of the DOB of the originator and the hash value of the DOB of the beneficiary) other than the information indicating that beneficiary is verified to match the originator, the originating VASP server 140 may not transfer the virtual asset to the beneficiary virtual asset address.

In this way, as an originating VASP server transmits hashed personal information (name or birth of date) rather than original personal information, the risk of exposing personal information of the originator can be reduced. Moreover, whether the originator matches the beneficiary can be verified without transmitting personal information of the originator.

In this way, as the virtual asset is transferred only when it is verified that the originator and the beneficiary match (e.g., the originator and the beneficiary are the same person), the safety and the reliability of the transfer of the virtual asset can be improved.

FIG. 2B illustrates a process in which the electronic device 100 verifies an originator according to the example embodiment. Here, the electronic device 100 may refer to a server existing inside the beneficiary VASP. For example, the electronic device 100 may be implemented as an entity physically coupled with the beneficiary VASP server 120 inside the beneficiary VASP. In this case, the electronic device 100 and the beneficiary VASP server 120 may be functionally or logically separated. For another example, the electronic device 100 and the beneficiary VASP server 120 exist inside the beneficiary VASP, but may be implemented as physically distinct entities as well as functionally or logically distinct. In the description of FIG. 2B, description overlapping the description of FIG. 2A will be briefly described or omitted.

In operation S250, the beneficiary VASP server 120 may identify a virtual asset transferred to the beneficiary virtual asset address according to an embodiment. For example, the beneficiary VASP server 120 may identify a virtual asset of deposit transferred by the originating VASP server 140 to the beneficiary virtual asset address. However, before verification of the originator is completed, the beneficiary VASP server 120 may not reflect the transferred virtual asset in the balance status of the beneficiary which the beneficiary can check through the account of the beneficiary.

In operation S255, the electronic device 100 may receive information regarding the transfer of the virtual asset from the beneficiary VASP server 120 according to the example embodiment. For example, from the beneficiary VASP server 120, the electronic device 100 may receive at least some of a value representing the type of virtual asset, information regarding the beneficiary VASP, the beneficiary virtual asset address, the full name data of the beneficiary and the DOB data of the beneficiary. Here, the beneficiary VASP server 120 may also transmit an auxiliary virtual asset address to the electronic device 100 according to the type of the virtual asset.

In operation S260, according to an example embodiment, the electronic device 100 may identify a hash value of the full name of the beneficiary and a hash value of the DOB of the beneficiary. For example, by hashing each of the full name data of the beneficiary and the DOB data of the beneficiary received from the beneficiary VASP server 120, the electronic device 100 may generate a hash value of the full name of the beneficiary and a hash value of the DOB of the beneficiary.

According to an example embodiment, the electronic device 100 may generate a hash value set of the full name of the beneficiary including one or more hash values of the full name of the beneficiary by hashing the full name data of the beneficiary. For example, the electronic device 100 may generate a hash value by hashing full name information of the beneficiary composed of a single entry in order of first name and last name, or may generate a hash value by hashing the full name information of the beneficiary composed of a single entry in the order of last name and first name. Alternatively, the electronic device 100 may generate a hash value by hashing the full name of the beneficiary in Korean, or may generate a hash value by hashing the full name of the beneficiary in English. This will be described in detail with reference to FIGS. 7A to 7D.

In operation S265, the electronic device 100 may transmit a verification request message to the originating VASP server 140 according to the example embodiment. For example, to the originating VASP server 140, the electronic device 100 may transmit the verification request message including at least some of an identification value of the verification request message, a value representing the type of a verification target, a value representing the type of virtual asset, information regarding the beneficiary VASP, the beneficiary virtual asset address, a hash value of the full name of the beneficiary, a hash value of the DOB of the beneficiary, a hash salt value and a transaction identification value corresponding to the transfer of the virtual asset. Here, the electronic device 100 may also transmit an auxiliary virtual asset address to the originating VASP server 140 according to the type of the virtual asset. Details of values included in the verification request message will be described in detail with reference to FIGS. 5A and 5B.

In operation S270, the originating VASP server 140 may verify whether the beneficiary and the originator match according to an example embodiment. Meanwhile, the case that the beneficiary and the originator match may include a case where the beneficiary and the originator are the same person.

For example, the originating VASP server 140 may identify the full name data of the originator and the DOB data of the originator corresponding to the beneficiary virtual asset address or the transaction identification value, may hash each of the full name data of the originator and the DOB data of the originator, and may generate a hash value of the full name of the originator and a hash value of the DOB of the originator. Thereafter, the originating VASP server 140 may identify whether the hash value of the full name of the beneficiary received from the electronic device 100 matches the hash value of the full name of the originator, and whether the hash value of the DOB of the beneficiary received from the electronic device 100 matches the hash value of the DOB of the originator.

According to an example embodiment, the originating VASP server 140 may identify whether there is a value matching the transaction identification value. For example, the originating VASP server 140 may identify whether a value identical to the transaction identification value received from the electronic device 100 exists in the database.

According to an example embodiment, regardless of whether at least one character included in the transaction identification value is a lowercase letter or an uppercase letter, the originating VASP server 140 may identify whether there is a value matching the transaction identification value. Accordingly, an unintentional mismatch that can be caused by distinguishing between an uppercase letter and a lowercase letter may be prevented.

According to an example embodiment, if the type of the transaction identification value includes an identifier type and a hash value type, the originating VASP server 140 may identify whether there is a value matching the transaction identification value, by using a hash value type transaction identification value. For example, if the transaction identification value of the identification type and the transaction identification value of the hash value type are different, the originating VASP server 140 may identify whether there is a value matching the transaction identification value, by using the hash value type transaction identification value. Accordingly, an unintentional mismatch between the VASP requesting verification and the VASP performing verification may be prevented.

According to an example embodiment, the originating VASP server 140 may identify whether there is a value matching the transaction identification value by using the transaction identification value including a value of a leading zero. For example, if the identification value of the transaction is 0.0.15852-1648154322-083000000, the originating VASP server 140 may use the transaction identification value including 83000000 to identify whether there is a value matching the transaction identification value. Accordingly, may be prevented an unintentional mismatch that may occur between a VASP that removes a value of a leading zero for data storage according to the VASP's policy and a VASP that includes a value of a leading zero for data storage.

According to an example embodiment, the originating VASP server 140 may identify whether there is an address matching the beneficiary virtual asset address or the auxiliary virtual asset address. For example, the originating VASP server 140 may identify whether an address identical to the beneficiary virtual asset address received from the electronic device 100 exists in the database. Alternatively, if the originating VASP server 140 also receives an auxiliary virtual asset address from the electronic device 100, the originating VASP server 140 may identify whether an address matching the beneficiary virtual asset address and the auxiliary virtual asset address exists in the database.

According to an example embodiment, the originating VASP server 140 may identify the full name data of the originator and the DOB data of the originator. For example, if it is identified that a value matching the transaction identification value received from the electronic device 100 and an address matching the beneficiary virtual asset address exist in the database, the originating VASP server 140 may identify the full name data of the originator and the DOB data of the originator corresponding to the transaction identification value or the beneficiary virtual asset address.

According to an example embodiment, the originating VASP server 140 may identify whether the hash value of one or more names of the beneficiary matches the hash value of one or more names of the originator. For example, the originating VASP server 140 may receive a hash value of one full name of the beneficiary from the electronic device 100, and may identify whether the hash value of one full name of the beneficiary matches the hash value of one full name of the originator. Alternatively, the originating VASP server 140 may receive a hash value set of full name of the beneficiary including hash values of one or more full names of the beneficiary from the electronic device 100, and may identify whether the hash value of one full name of the originator matches any one of the hash values of one or more full names of the beneficiary. The originating VASP server 140 may receive a hash value of one full name of the beneficiary from the electronic device 100, and may identify whether the hash value of one full name of the beneficiary matches any one of the hash values of one or more full names of the originator. This will be described in detail with reference to FIGS. 7A to 7D.

According to an example embodiment, a method of verifying the originator may be performed based on a hash value of information other than the DOB. For example, the electronic device 100 may identify a hash value of the mobile phone number of the beneficiary generated based on the mobile phone number data of the beneficiary, and the originating VASP server 140 may identify whether the mobile phone number of the originator matches the hash value. However, the type of information that can be used to verify the originator is not limited thereto.

According to an example embodiment, the originating VASP server 140 may verify whether the beneficiary matches the originator regardless of the type of the virtual asset. For example, if a value indicating the type of virtual asset included in the verification request message is LUNA and if the type of virtual asset held by the originating VASP server 140 is LUNA2, there may not be a value matching LUNA. In this case, the originating VASP server 140 may skip a process of identifying whether there is a value that matches a value representing the type of virtual asset, and may verify whether the beneficiary and the originator match. Accordingly, may be prevented an unintentional mismatch that may arise from the absence of standard naming rules for a value or a symbol representing the type of virtual asset.

Further, the originating VASP server 140 may identify the full name data of the originator and the DOB data of the originator using the originating virtual asset address instead of the transaction identification value or a beneficiary virtual asset address according to an example embodiment. For example, in operation S250, after identifying the transferred virtual asset, the beneficiary VASP server 120 may identify an originating virtual asset address. In operation S255, the beneficiary VASP server 120 may transmit information regarding the transfer of the virtual asset including the originating virtual asset address to the electronic device 100, and in operation S265, the electronic device 100 may transmit a verification request message including the originating virtual asset address to the originating VASP server 140. The originating VASP server 140 may identify the full name data of the originator and the DOB data of the originator corresponding to the received originating virtual asset address.

In operation S275, the electronic device 100 may receive a response message including the verification result information generated based on the verification request message from the originating VASP server 140 according to the example embodiment. For example, from the originating VASP server 140, the electronic device 100 may receive a response message including at least some of information indicating that a value matching the transaction identification value is not identified, information indicating that an address matching the beneficiary virtual asset address or the auxiliary virtual asset address is not identified, information regarding the mismatch between the hash value of the full name of the beneficiary and the hash value of the full name of the originator, information regarding the mismatch between the hash value of the DOB of the beneficiary and the hash value of the DOB of the originator, and information indicating that the originator is verified to match the beneficiary. This will be described in detail with reference to FIG. 6.

In operation S280, the electronic device 100 may transmit a response message to the beneficiary VASP server 120 according to the example embodiment. For example, the electronic device 100 may transmit the response message received from the originating VASP server 140 to the beneficiary VASP server 120.

In operation S285, according to an example embodiment, the beneficiary VASP server 120 may reflect the virtual asset transferred to the virtual asset address of the beneficiary to the balance of the beneficiary virtual asset address based on the verification result information included in the response message. For example, if the response message received from the electronic device 100 includes information indicating that the originator is verified to match the beneficiary, the beneficiary VASP server 120 may reflect the transferred virtual asset to the balance of the beneficiary virtual asset address at every configured time or whenever a response message is received. Alternatively, if the response message received from the electronic device 100 includes information (for example, at least some of information indicating that a value matching the transaction identification value is not identified, information indicating that an address matching the originating virtual asset address or the auxiliary virtual asset address is not identified, information regarding the mismatch between the hash value of the full name of the originator and the hash value of the full name of the beneficiary, and information regarding the mismatch between the hash value of the DOB of the originator and the hash value of the DOB of the beneficiary) other than the information indicating that the originator is verified to match the beneficiary, the beneficiary VASP server 120 may not reflect the transferred virtual asset to the balance of the beneficiary virtual asset address.

In this way, as a beneficiary VASP server transmits hashed personal information (name or birth of date) rather than original personal information, the risk of exposing personal information of the beneficiary can be reduced. Moreover, whether the beneficiary matches the originator can be verified without transmitting personal information of the beneficiary.

In this way, as the virtual asset is reflected to a balance of the beneficiary virtual asset address only when it is verified that the originator and the beneficiary match (e.g., the originator and the beneficiary are the same person), the safety and the reliability of the transfer of the virtual asset can be improved.

Figure 3A:
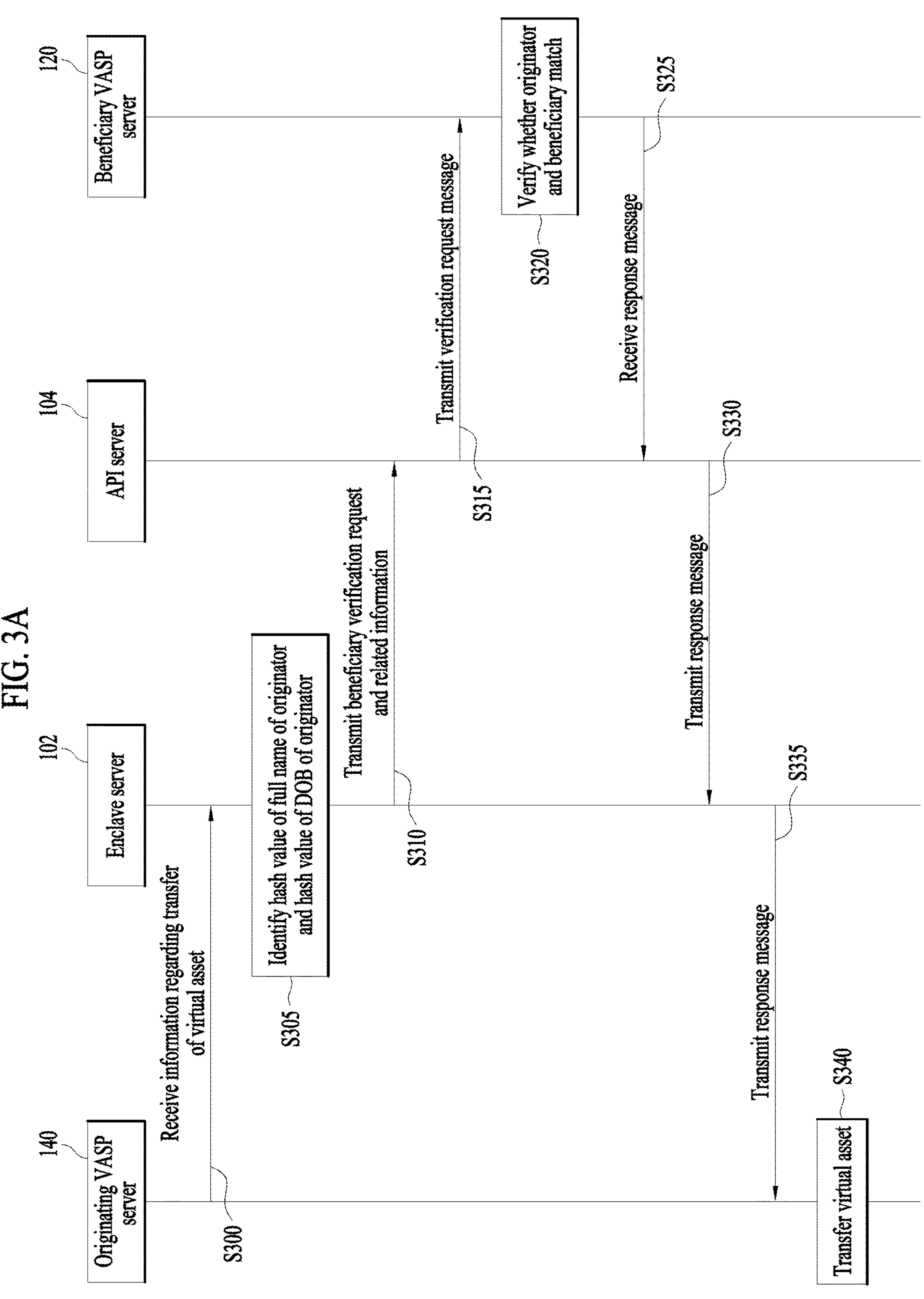
FIGS. 3A and 3B are flowcharts for explaining a process of verifying a beneficiary or an originator by an electronic device according to an example embodiment.
Figure 3B:
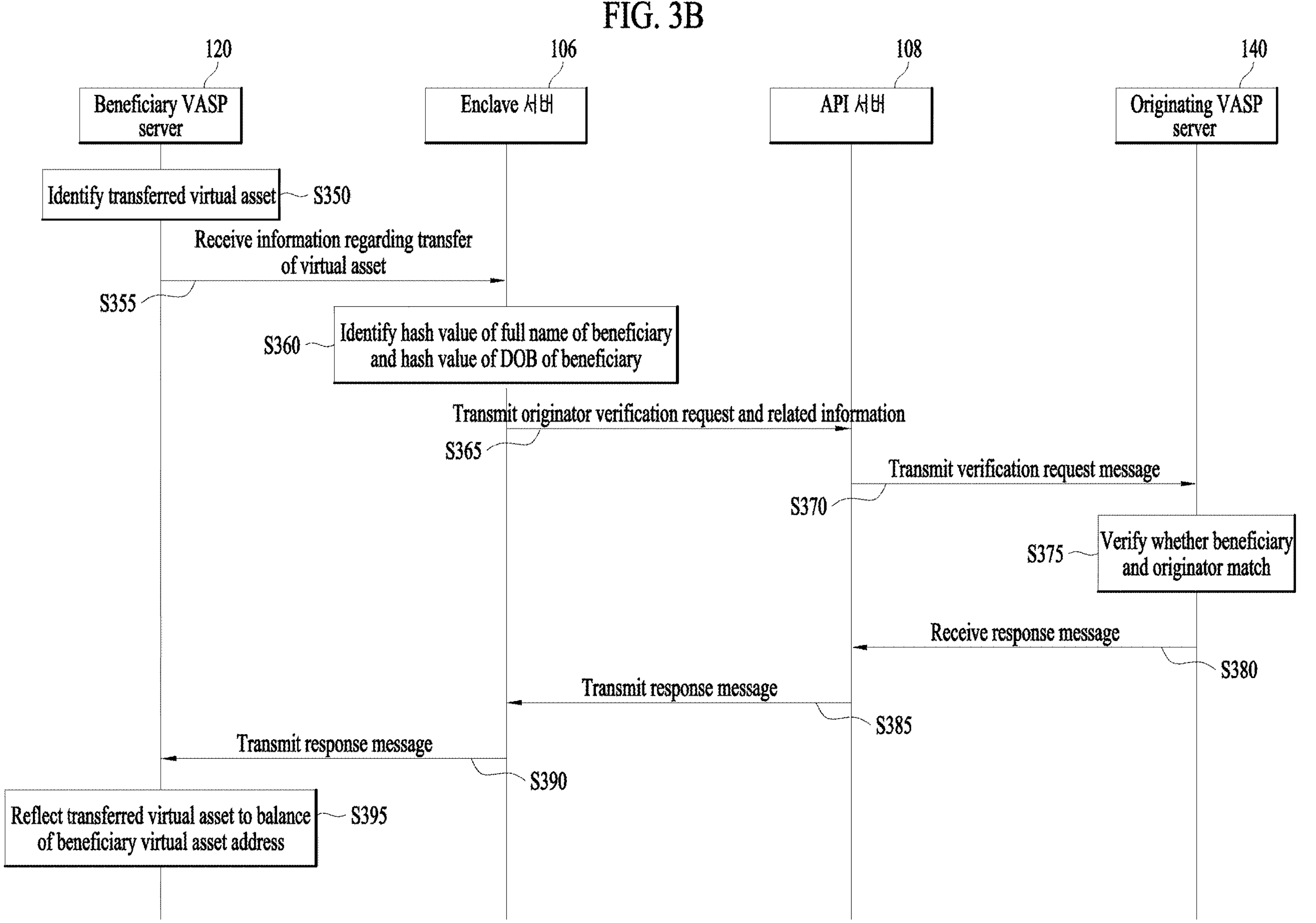

FIGS. 3A and 3B are flowcharts for explaining a process of verifying a beneficiary or an originator by the electronic device 100 according to an example embodiment. With respect to FIGS. 3A and 3B, description overlapping the description of FIGS. 2A and 2B will be briefly described or omitted.

According to the example embodiment, a user may transfer the virtual asset in his/her wallet managed by the originating VASP to the user's wallet managed by the beneficiary VASP using the user terminal 160. In other words, an account of an originating VASP (for example, an account of an originator) transferring a virtual asset and an account of a beneficiary VASP (for example, an account of a beneficiary) receiving the virtual asset may correspond to the same person.

FIG. 3A illustrates a process in which the electronic device 100 verifies a beneficiary according to the example embodiment. Here, an enclave server 102 may communicate with an API server 104 as a server existing inside the originating VASP, and the API server 104 may be a server that exists outside the originating VASP and may act as a message intermediary. Further, the electronic device 100 may indicate the enclave server 102 or the API server 104.

In operation S300, the enclave server 102 may receive information regarding the transfer of a virtual asset from the originating VASP server 140 according to the example embodiment. For example, from the user terminal 160, the originating VASP server 140 may receive at least some of a value representing a type of virtual asset that the user wishes to transfer, information regarding a beneficiary VASP and a beneficiary virtual asset address. Hereinafter, to the enclave server 102, the originating VASP server 140 may transmit at least some of a value representing the type of virtual asset, information regarding the beneficiary VASP, the beneficiary virtual asset address, full name data of the originator and DOB data of the originator. Here, the originating VASP server 140 may also transmit an auxiliary virtual asset address to the enclave server 102 according to the type of the virtual asset.

In operation S305, the enclave server 102 may identify a hash value of the full name of the originator and a hash value of the DOB of the originator according to the example embodiment. For example, the enclave server 102 may hash each of the full name data of the originator and the DOB data of the originator received from the originating VASP server 140 to generate a hash value of the full name of the originator and a hash value of the DOB of the originator.

In operation S310, the enclave server 102 may transmit a beneficiary verification request and related information to the API server 104 according to the example embodiment. For example, to the API server 104, the enclave server 102 may transmit at least some of a value representing the type of a verification target, a value representing the type of virtual asset, information regarding the beneficiary VASP, the beneficiary virtual asset address, a hash value of the full name of the originator, a hash value of the DOB of the originator and a hash salt value. Here, the enclave server 102 may also transmit an auxiliary virtual asset address to the API server 104 according to the type of the virtual asset.

In operation S315, the API server 104 may transmit a verification request message to the beneficiary VASP server 120 according to the example embodiment. For example, to the beneficiary VASP server 120, the API server 104 may transmit a verification request message including at least some of an API access key, an identification value of the verification request message, a value representing the type of a verification target, a value representing the type of virtual asset, information regarding originating VASP, a beneficiary virtual asset address, a hash value of the full name of the originator, a hash value of the DOB of the originator, and a hash salt value. Here, the API server 104 may also transmit an auxiliary virtual asset address to the beneficiary VASP server 120 according to the type of the virtual asset. Details of values included in the verification request message will be described with reference to FIGS. 5A and 5B.

In operation S320, according to the example embodiment, the beneficiary VASP server 120 may verify whether the originator and the beneficiary match. For example, the beneficiary VASP server 120 may identify full name data of the beneficiary and DOB data of the beneficiary corresponding to the beneficiary virtual asset address, may hash each of the full name data of the beneficiary and the DOB data of the beneficiary, and may generate a hash value of the full name of the beneficiary and a hash value of the DOB of the beneficiary. Thereafter, the beneficiary VASP server 120 may identify whether the hash value of the full name of the originator received from the API server 104 matches the hash value of the full name of the beneficiary, and whether the hash value of the DOB of the originator received from the API server 104 matches the hash value of the DOB of the beneficiary. A more specific operation of the beneficiary VASP server 120 verifying whether the originator and the beneficiary match overlaps the description in relation to operation S215 of FIG. 2, and thus it is omitted.

In operation S325, the API server 104 may receive a response message including verification result information generated based on the verification request message from the beneficiary VASP server 120 according to the example embodiment. For example, from the beneficiary VASP server 120, the API server 104 may receive a response message including at least some of information indicating that an address matching the beneficiary virtual asset address or the auxiliary virtual asset address is not identified, information regarding the mismatch between the hash value of the full name of the originator and the hash value of the full name of the beneficiary, information regarding the mismatch between the hash value of the DOB of the originator and the hash value of the DOB of the beneficiary, and information indicating that the beneficiary is verified to match the originator. This will be described in detail with reference to FIG. 6.

In operation S330, the API server 104 may transmit a response message to the enclave server 102 according to the example embodiment. For example, the API server 104 may transmit the response message received from the beneficiary VASP server 120 to the enclave server 102.

In operation S335, the enclave server 102 may transmit a response message to the originating VASP server 140 according to the example embodiment. For example, the enclave server 102 may transmit the response message received from the API server 104 to the originating VASP server 140.

In operation S340, the originating VASP server 140 may transfer the virtual asset to the beneficiary virtual asset address based on the verification result information included in the received response message. For example, if the response message received from the enclave server 102 includes information indicating that the beneficiary is verified to match the originator, the originating VASP server 140 may transfer the virtual asset to the beneficiary virtual asset address according to the information received from the user terminal 160. Alternatively, if the response message received from the enclave server 102 includes information other than the information indicating that the beneficiary is verified to match the originator, the originating VASP server 140 may not transfer the virtual asset to the beneficiary virtual asset address.

FIG. 3B illustrates a process in which the electronic device 100 verifies an originator according to the example embodiment. Here, an enclave server 106 may communicate with an API server 108 as a server existing inside the beneficiary VASP, and the API server 108 may be a server that exists outside the beneficiary VASP and may act as a message intermediary. Meanwhile, the electronic device 100 may indicate the enclave server 106 or the API server 108.

In operation S350, the beneficiary VASP server 120 may identify the virtual asset transferred to the beneficiary virtual asset address according to the example embodiment. For example, the beneficiary VASP server 120 may identify a virtual asset or deposit transferred by the originating VASP server 140 to the beneficiary virtual asset address.

In operation S355, the enclave server 106 may receive information regarding the transfer of the virtual asset from the beneficiary VASP server 120 according to the example embodiment. For example, from the beneficiary VASP server 120, the enclave server 106 may receive at least some of a value representing the type of virtual asset, information regarding the beneficiary VASP, the beneficiary virtual asset address, the full name data of the beneficiary and the DOB data of the beneficiary. Here, the beneficiary VASP server 120 may also transmit an auxiliary virtual asset address to the enclave server 106 according to the type of the virtual asset.

In operation S360, the enclave server 106 may identify a hash value of the full name of the beneficiary and a hash value of the DOB of the beneficiary according to the example embodiment. For example, the enclave server 106 may hash the full name data of the beneficiary and the DOB data of the beneficiary received from the beneficiary VASP server 120 to generate a hash value of the full name of the beneficiary and a hash value of the DOB of the beneficiary.

In operation S365, the enclave server 106 may transmit an originator verification request and related information to the API server 108 according to the example embodiment. For example, to the API server 108, the enclave server 106 may transmit at least some of a value representing the type of a verification target, a value representing the type of virtual asset, information regarding the beneficiary VASP, the beneficiary virtual asset address, a hash value of the full name of the beneficiary, a hash value of the DOB of the beneficiary, a hash salt value and a transaction identification value corresponding to the transfer of the virtual asset. Here, the enclave server 106 may also transmit an auxiliary virtual asset address to the API server 108 according to the type of the virtual asset.

In operation S370, the API server 108 may transmit a verification request message to the originating VASP server 140 according to the example embodiment. For example, to the originating VASP server 140, the electronic device 100 may transmit a verification request message including at least some of an API access key, an identification value of the verification request message, a value representing the type of a verification target, a value representing the type of virtual asset, information regarding the beneficiary VASP, the beneficiary virtual asset address, a hash value of the full name of the beneficiary, a hash value of the DOB of the beneficiary, a hash salt value and a transaction identification value corresponding to the transfer of the virtual asset. Here, the API server 108 may also transmit an auxiliary virtual asset address to the originating VASP server 140 according to the virtual asset type. Details of values included in the verification request message will be described in detail with reference to FIGS. 5A and 5B.

In operation S375, the originating VASP server 140 may verify whether the beneficiary and the originator match according to the example embodiment. For example, the originating VASP server 140 may identify the full name data of the originator and the DOB data of the originator corresponding to the beneficiary virtual asset address or the transaction identification value, may hash each of the full name data of the originator and the DOB data of the originator, and may generate a hash value of the full name of the originator and a hash value of the DOB of the originator. Thereafter, the originating VASP server 140 may identify whether the hash value of the full name of the beneficiary received from the electronic device 100 matches the hash value of the full name of the originator, and whether the hash value of the DOB of the beneficiary received from the electronic device 100 matches the hash value of the DOB of the originator. A more specific operation of the originating VASP server 140 verifying whether the beneficiary and the originator match overlaps the description in relation to operation S270 of FIG. 2, and thus it is omitted.

Meanwhile, according to an example embodiment, the originating VASP server 140 may identify the full name data of the originator and the DOB data of the originator using an originating virtual asset address instead of the transaction identification value or the beneficiary virtual asset address. For example, in operation S350, after identifying the transferred virtual asset, the beneficiary VASP server 120 may identify an originating virtual asset address for transmission. In operation S355, the beneficiary VASP server 120 may transmit information regarding transfer of the virtual asset including the originating virtual asset address to the enclave server 106, and in operation S365, the enclave server 106 may transmit related information including the originating virtual asset address to the API server 108. The originating VASP server 140 may receive a verification request message including the originating virtual asset address from the API server 108, and may identify the full name data of the originator and the DOB data of the originator corresponding to the received originating virtual asset address.

In operation S380, the API server 108 may receive a response message including the verification result information generated based on the verification request message from the originating VASP server 140 according to the example embodiment. For example, from the originating VASP server 140, the API server 108 may receive a response message including at least some of information indicating that a value matching the transaction identification value is not identified, information indicating that an address matching the beneficiary virtual asset address or the auxiliary virtual asset address is not identified, information regarding the mismatch between the hash value of the full name of the beneficiary and the hash value of the full name of the originator, information regarding the mismatch between the hash value of the DOB of the beneficiary and the hash value of the DOB of the originator, and information indicating that the originator is verified to match the beneficiary. This will be described in detail with reference to FIG. 6.

In operation S385, the API server 108 may transmit a response message to the enclave server 106 according to the example embodiment. For example, the API server 108 may transmit the response message received from the originating VASP server 140 to the enclave server 106.

In operation S390, the enclave server 106 may transmit the response message to the beneficiary VASP server 120 according to the example embodiment. For example, the enclave server 106 may transmit the response message received from the API server 108 to the beneficiary VASP server 120.

In operation S395, according to the example embodiment, based on the verification result information included in the response message, the beneficiary VASP server 120 may reflect the virtual asset transferred to the virtual asset address of the beneficiary to the balance of the beneficiary virtual asset address. For example, if the response message received from the enclave server 106 includes information indicating that the originator is verified to match the beneficiary, the beneficiary VASP server 120 may reflect the transferred virtual asset to the balance of the beneficiary virtual asset address at every configured time or whenever a response message is received. Alternatively, if the response message received from the enclave server 106 includes information other than the information indicating that the originator is verified to match the beneficiary, the beneficiary VASP server 120 may not reflect the transferred virtual asset to the balance of the receiving virtual address.

Figure 4A:
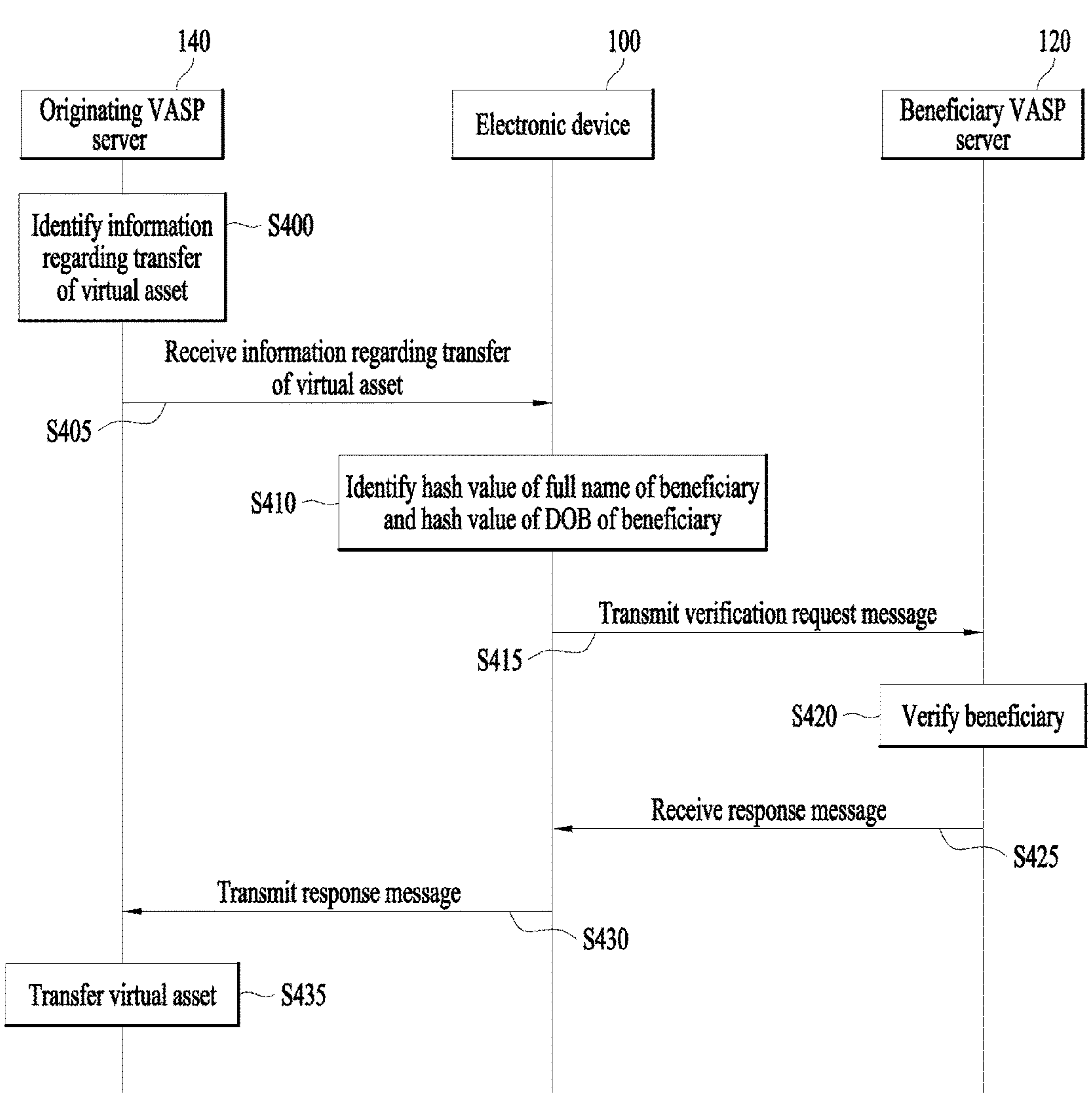
FIGS. 4A and 4B are flowcharts for explaining a process of verifying a beneficiary or an originator by an electronic device according to an example embodiment.
Figure 4B:
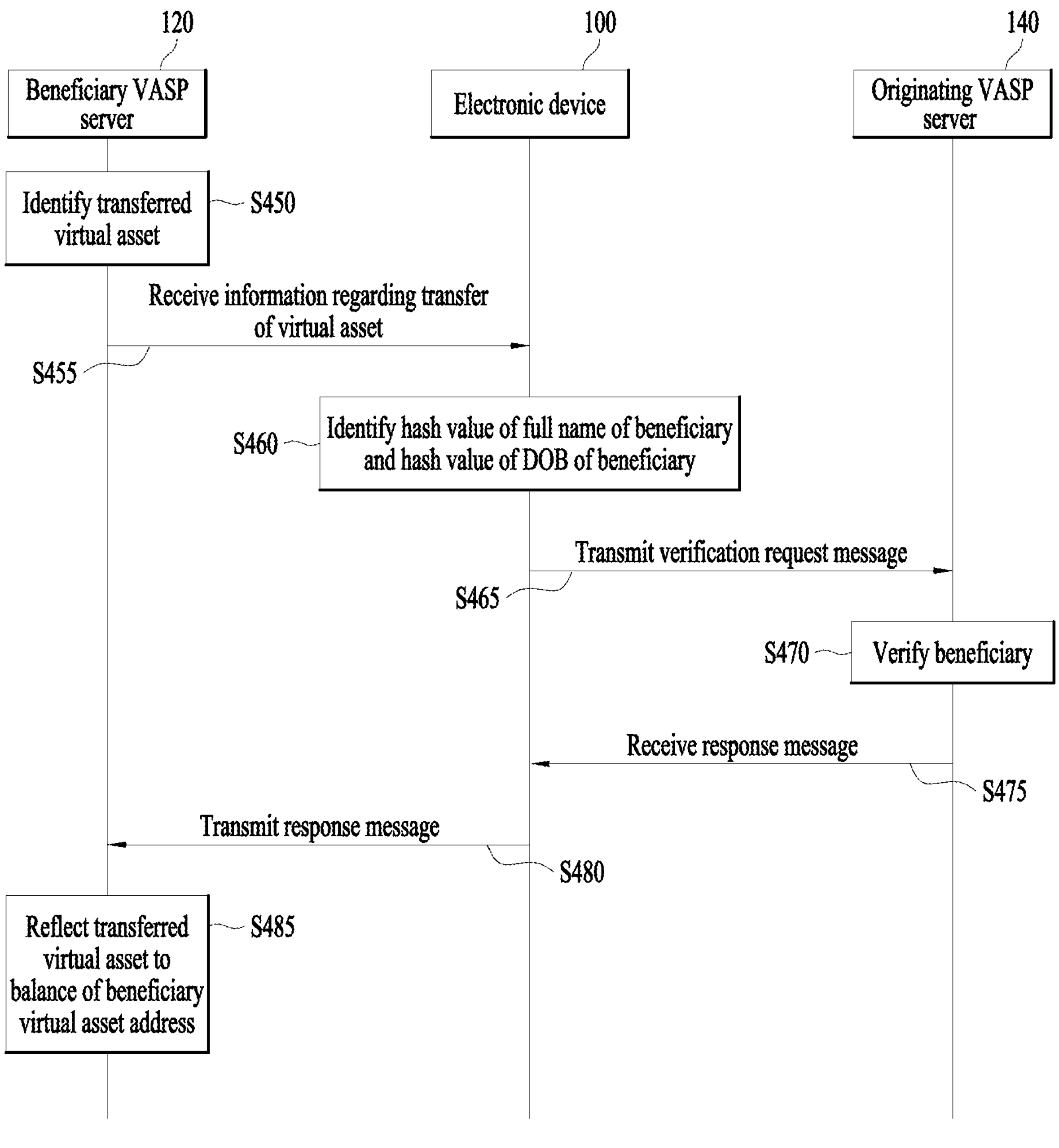

FIGS. 4A and 4B are flowcharts for explaining a process of verifying a beneficiary or an originator by the electronic device 100 according to an example embodiment. With respect to FIGS. 4A and 4B, description overlapping the description of FIGS. 2A and 2B will be briefly described or omitted.

According to an example embodiment, a user may transfer a virtual asset in his/her wallet managed by the originating VASP to another person's wallet managed by the beneficiary VASP using the user terminal 160. In other words, the originator that transfers the virtual asset and the beneficiary that receives the virtual asset may be different.

FIG. 4A illustrates a process in which the electronic device 100 verifies a beneficiary according to the example embodiment. Here, the electronic device 100 may refer to a server existing inside an originating VASP.

In operation S400, the originating VASP server 140 may identify information regarding a transfer of a virtual asset according to the example embodiment. For example, from the user terminal 160, the originating VASP server 140 may receive at least some of a value representing the type of virtual asset that the user wishes to transfer, information regarding a beneficiary VASP, a beneficiary virtual asset address, full name data of the beneficiary and DOB data of the beneficiary.

In operation S405, according to the example embodiment, the electronic device 100 may receive information regarding transfer of the virtual asset from the originating VASP server 140. For example, to the electronic device 100, the originating VASP server 140 may transmit at least some of a value representing the type of virtual asset, information regarding the beneficiary VASP, the beneficiary virtual asset address, the full name data of the beneficiary and the DOB data of the beneficiary. Here, the originating VASP server 140 may also transmit an auxiliary virtual asset address to the electronic device 100 according to the type of the virtual asset.

In operation S410, according to the example embodiment, the electronic device 100 may identify a hash value of the full name of the beneficiary and a hash value of the DOB of the beneficiary. For example, the electronic device 100 may hash each of full name data of the beneficiary and DOB data of the beneficiary received from the originating VASP server 140 to generate a hash value of the full name of the beneficiary and a hash value of the DOB of the beneficiary.

In operation S415, according to the example embodiment, the electronic device 100 may transmit a verification request message to the beneficiary VASP server 120. For example, to the beneficiary VASP server 120, the electronic device 100 may transmit a verification request message including at least some of an identification value of the verification request message, a value representing the type of a verification target, a value representing the type of virtual asset, information regarding the originating VASP, the beneficiary virtual asset address, a hash value of the full name of the beneficiary, a hash value of the DOB of the beneficiary, and a hash salt value. Here, the electronic device 100 may also transmit an auxiliary virtual asset address to the beneficiary VASP server 120 according to the type of the virtual asset. Details of values included in the verification request message will be described with reference to FIGS. 5A and 5B.

In operation S420, according to the example embodiment, the beneficiary VASP server 120 may verify whether beneficiaries match. More specifically, the beneficiary VASP server 120 may verify whether the hash value of a beneficiary (or a first beneficiary) received from the electronic device 100 matches the hash value of a beneficiary (or a second beneficiary) corresponding to the receiving virtual address.

For example, the beneficiary VASP server 120 may identify full name data of the second beneficiary and DOB data of the second beneficiary corresponding to the beneficiary virtual asset address, may hash the full name data of the second beneficiary and the DOB data of the second beneficiary, respectively, and may generate a hash value of the full name of the second beneficiary and a hash value of the DOB of the second beneficiary. Here, the beneficiary VASP server 120 may identify whether the hash value of the full name of the first beneficiary received from the electronic device 100 matches the hash value of the full name of the second beneficiary, and whether the hash value of the DOB of the first beneficiary received from the electronic device 100 matches the hash value of the DOB of the second beneficiary.

According to an example embodiment, the beneficiary VASP server 120 may identify whether there is an address matching a beneficiary virtual asset address or the auxiliary virtual asset address. For example, the beneficiary VASP server 120 may identify whether an address identical to the beneficiary virtual asset address received from the electronic device 100 exists in the database. Alternatively, if the beneficiary VASP server 120 also receives the auxiliary virtual asset address from the electronic device 100, the beneficiary VASP server 120 may identify whether an address matching the beneficiary virtual asset address and the auxiliary virtual asset address exists in the database.

According to an example embodiment, the beneficiary VASP server 120 may identify the full name data of the second beneficiary and the DOB data of the second beneficiary. For example, if it is identified that an address matching the beneficiary virtual asset address received from the electronic device 100 exists in the database, the beneficiary VASP server 120 may identify the full name data of the second beneficiary and the DOB data of the second beneficiary corresponding to the beneficiary virtual asset address.

According to an example embodiment, the beneficiary VASP server 120 may identity whether hash values of one or more full names of the first beneficiary matches hash values of one or more full names of the second beneficiary. For example, the beneficiary VASP server 120 may receive a hash value of one full name of the first beneficiary from the electronic device 100, and may identify whether the hash value of the one full name of the first beneficiary matches a hash value of one full name of the second beneficiary. Alternatively, the beneficiary VASP server 120 may receive a hash value set of the full name of the first beneficiary including hash values of a plurality of full names of the first beneficiary from the electronic device 100, and may identify whether a hash value of one full name or the second beneficiary matches any one of the hash values of the plurality of full names of the first beneficiary. The beneficiary VASP server 120 may receive a hash value of one full name of the first beneficiary from the electronic device 100, and may identify whether the hash value of the one full name of the first beneficiary matches any one of hash values of a plurality of full names of the second beneficiary. It will be described in detail with reference to FIGS. 7E to 7H.

In operation S425, according to the example embodiment, the electronic device 100 may receive a response message including verification result information generated based on the verification request message from the beneficiary VASP server 120. For example, from the beneficiary VASP server 120, the electronic device 100 may receive a response message including at least some of information indicating that an address matching the beneficiary virtual asset address or the auxiliary virtual asset address is not identified, information regarding the mismatch on hash values of the full name of the beneficiary, information regarding the mismatch on hash values of the DOB of the beneficiary and information indicating that beneficiaries are verified to be identical. This will be described in detail with reference to FIG. 6.

In operation S430, the electronic device 100 may transmit the response message to the originating VASP server 140 according to the example embodiment. For example, the electronic device 100 may transmit the response message received from the beneficiary VASP server 120 to the originating VASP server 140.

In operation S435, the originating VASP server 140 may transfer the virtual asset to the beneficiary virtual asset address based on the verification result information included in the received response message. For example, if the response message received from the electronic device 100 includes information indicating that the beneficiaries are verified to be the same, the originating VASP server 140 may transfer the virtual asset to the beneficiary virtual asset address according to the information received from the user terminal 160. Alternatively, if the response message received from the electronic device 100 includes information other than the information indicating that beneficiaries are verified to be the same, the originating VASP server 140 may not transfer the virtual asset to the beneficiary virtual asset address.

FIG. 4B illustrates a process in which the electronic device 100 verifies a beneficiary according to the example embodiment. Here, the electronic device 100 may refer to a server existing inside a beneficiary VASP.

In operation S450, according to the example embodiment, the beneficiary VASP server 120 may identify the virtual asset transferred to the beneficiary virtual asset address. For example, the beneficiary VASP server 120 may identify the virtual asset or deposit transferred by the originating VASP server 140 to the beneficiary virtual asset address.

In operation S455, the electronic device 100 may receive information regarding the transfer of the virtual asset from the beneficiary VASP server 120 according to the example embodiment. For example, from the electronic beneficiary VASP server 120, the electronic device 100 may receive at least some of a value representing the type of virtual asset, information regarding the beneficiary VASP, the beneficiary virtual asset address, the full name data of the beneficiary and the DOB data of the beneficiary. Here, the beneficiary VASP server 120 may also transmit an auxiliary virtual asset address to the electronic device 100 according to the type of the virtual asset.

In operation S460, the electronic device 100 may identify a hash value of the full name of the beneficiary and a hash value of the DOB of the beneficiary according to the example embodiment. For example, the electronic device 100 may hash each of the full name data of the beneficiary and the DOB data of the beneficiary received from the beneficiary VASP server 120 to generate a hash value of the full name of the beneficiary and a hash value of the DOB of the beneficiary.

In operation S465, the electronic device 100 may transmit the verification request message to the originating VASP server 140 according to the example embodiment. For example, to the originating VASP server 140, the electronic device 100 may transmit a verification request message including at least some of an identification value of the verification request message, a value representing the type of a verification target, a value representing the type of virtual asset, information regarding the beneficiary VASP, the beneficiary virtual asset address, the hash value of the full name of the beneficiary, the hash value of the DOB of the beneficiary, a hash salt value and a transaction identification value corresponding to the transfer of the virtual asset. Here, the electronic device 100 may also transmit an auxiliary virtual asset address to the beneficiary VASP server 120 according to the type of the virtual asset. Details of values included in the verification request message will be described with reference to FIGS. 5A and 5B.

In operation S470, the originating VASP server 140 may verify whether beneficiaries match according to the example embodiment. More specifically, the originating VASP server 140 may verity whether a hash value of a beneficiary (or a first beneficiary) received from the electronic device 100 matches a hash value of a beneficiary (or a second beneficiary) corresponding to the beneficiary virtual asset address or the transaction identification value.

For example, the originating VASP server 140 may identify full name data of the second beneficiary and DOB data of the second beneficiary corresponding to the beneficiary virtual asset address or the transaction identification value, may hash the full name data of the second beneficiary and the DOB data of the second beneficiary, respectively, and may generate a hash value of the full name of the second beneficiary and a hash value of the DOB of the second beneficiary. Here, the originating VASP server 140 may identify whether the hash value of the full name of the first beneficiary received from the electronic device 100 matches the hash value of the full name of the second beneficiary, and whether the hash value of the DOB of the first beneficiary received from the electronic device 100 matches the hash value of the DOB of the second beneficiary.

Here, the originating VASP server 140 may receive the full name data of the second beneficiary and the DOB data of the second beneficiary from the user terminal 160 before transferring the virtual asset and store them in the database. More specifically, the user terminal 160 may obtain a user input for entering full name data and DOB data of the beneficiary corresponding to the beneficiary virtual asset address to which the originator intends to transfer the virtual asset, and may transmit the obtained full name data of the beneficiary and the DOB data to the originating VASP server 140. Thereafter, the originating VASP server 140 may store the received full name data of the second beneficiary and the DOB data of the second beneficiary in the database, and may generate a hash value of full name of the second beneficiary and a hash value of the DOB of the second beneficiary by hashing the data.

According to an example embodiment, the originating VASP server 140 may identify whether there is a value matching the transaction identification value. For example, the originating VASP server 140 may identify whether a value identical to the transaction identification value received from the electronic device 100 exists in the database.

According to an example embodiment, the originating VASP server 140 may identify whether there is an address matching the beneficiary virtual asset address or the auxiliary virtual asset address. For example, the originating VASP server 140 may identify whether an address identical to the beneficiary virtual asset address received from the electronic device 100 exists in the database. Alternatively, if the originating VASP server 140 also receives an auxiliary virtual asset address from the electronic device 100, the originating VASP server 140 may identify whether an address matching the beneficiary virtual asset address and the auxiliary virtual asset address exists in the database.

According to an example embodiment, the originating VASP server 140 may identify the full name data of the second beneficiary and the DOB data of the second beneficiary. For example, if it is identified that a value matching the transaction identification value received from the electronic device 100 and an address matching the beneficiary virtual asset address exist in the database, the originating VASP server 140 may identify the full name data of second beneficiary and the DOB data the second beneficiary corresponding to the transaction identification value or the beneficiary virtual asset address.

According to an example embodiment, the originating VASP server 140 may identify whether hash values of one or more full names of the first beneficiary matches hash values of one or more full names of the second beneficiary. For example, the originating VASP server 140 may receive a hash value of one full name of the first beneficiary from the electronic device 100, and identify whether the hash value of the one full name of the first beneficiary matches a hash value of one full name of the second beneficiary. Alternatively, the originating VASP server 140 may receive a hash value set of the full name of the first beneficiary including hash values of a plurality of full names of the first beneficiary from the electronic device 100, and may identify whether a hash value of one full name of the second beneficiary matches any one of the hash values of the plurality of full names of the first beneficiary. The originating VASP server 140 may receive a hash value of one full name of the first beneficiary from the electronic device 100, and may identify whether the hash value of the one full name of the first beneficiary matches any one of the hash values of a plurality of full names of the second beneficiary. This will be described in detail with reference to FIGS. 7E to 7H.

In operation S475, the electronic device 100 may receive a response message including the verification result information generated based on the verification request message from the originating VASP server 140 according to the example embodiment. For example, from the originating VASP server 140, the electronic device 100 may receive a response message including at least some of information indicating that a value matching the transaction identification value is not identified, information indicating that an address matching the beneficiary virtual asset address or the auxiliary virtual asset address is not identified, information regarding the mismatch of the hash values of full names of the beneficiary, information regarding the mismatch of the hash values of DOBs of the beneficiary and information indicating that beneficiaries are verified to be identical. This will be described in detail with reference to FIG. 6.

In operation S480, the electronic device 100 may transmit the response message to the beneficiary VASP server 120 according to the example embodiment. For example, the electronic device 100 may transmit the response message received from the originating VASP server 140 to the beneficiary VASP server 120.

In operation S485, according to the example embodiment, based on the verification result information included in the response message, the beneficiary VASP server 120 may reflect the virtual asset transferred to the virtual asset address of the beneficiary to the balance of the beneficiary virtual asset address. For example, if the response message received from the electronic device 100 includes information indicating that beneficiaries are verified to be the same, the beneficiary VASP server 120 may reflect the transferred virtual asset to the balance of the beneficiary virtual asset address at every configured time or whenever a response message is received. Alternatively, if the response message received from the electronic device 100 includes information other than the information indicating that the beneficiaries are verified to be the same, the beneficiary VASP server 120 may not reflect the transferred virtual asset to the balance of the receiving virtual address.

FIGS. 5A and 5B illustrate examples of verification request messages 500 and 550 according to the example embodiments.

According to an example embodiment, the verification request messages 500 and 550 may include query parameters 510 and 560, headers 520 and 570, and bodies 530 and 580. Here, data included in the query parameters 510 and 560, the headers 520 and 570 and the bodies 530 and 580 may be expressed in a string type based on a javascript object notation (json) format, but it is not limited thereto.

According to an example embodiment, the query parameters 510 and 560 may include identification values of the verification request messages 500 and 550.

According to an example embodiment, the identification value "reqID" of the verification request messages 500 and 550 may indicate a unique identification value assigned to each request message for reconciliation. For example, identification values of the verification request messages 500 and 550 may be assigned to each of the verification request messages 500 and 550 transmitted by the electronic device 100, and may be used to distinguish the verification request messages 500 and 550.

According to an example embodiment, the headers 520 and 570 may include at least some of a value indicating a type of content, an API access key, and information regarding a beneficiary VASP or an originating VASP.

According to an example embodiment, the value "Content-Type" indicating the type of content may indicate a format of data included in the verification request messages 500 and 550. For example, a value representing the type of content may be set to "application/json."

According to an example embodiment, the API access key "VASP-API-Key" may represent a token transmitted by the electronic device 100 for approval when calling an API. For example, the electronic device 100 may, at the same time of requesting the VASP server to register the IP address of the endpoint of the electronic device 100, request an API access key. Accordingly, the electronic device 100 may receive the API access key from the VASP server and generate a VASP code.

According to an example embodiment, information regarding the beneficiary VASP or the originating VASP may indicate the code "VASP-Counterparty-Code" of the counterpart VASP. For example, the VASP code is a unique identification value for distinguishing the VASP, and may be registered in the system of the electronic device 100 in the process of receiving the API access key.

According to an example embodiment, the bodies 530 and 580 may include at least some of a value indicating the type of a verification target, a value representing the type of virtual asset, a beneficiary virtual asset address, a hash value of the full name of the originator, a hash value of the DOB of the originator and a hash salt value. Alternatively, the bodies 530 and 580 may include the transaction identification value corresponding to the transfer of the virtual asset according to the type of the verification target, and may include an auxiliary virtual asset address according to the type of the virtual asset.

According to an example embodiment, the value "verificationType" indicating the type of a verification target may indicate whether the verification target is an originator or a beneficiary. For example, if the verification target is an originator, the value representing the type of a verification target may include "VerifyOriginator," and if the verification target is a beneficiary, a value representing the type of a verification target may include "VerifyBeneficiary." Accordingly, in FIG. 2A, the electronic device 100 may transmit the verification request messages 500 and 550 including "VerifyBeneficiary" to the beneficiary VASP server 120, and in FIG. 2B, the electronic device 100 may transmit the verification request messages 500 and 550 including "VerifyOriginator" to the originating VASP server 140.

According to an example embodiment, the transaction identification value "txID" corresponding to the transfer of a virtual asset may represent a unique identification number assigned to each transfer of a virtual asset. For example, the transaction identification value may be used to identify an originator, a beneficiary or a beneficiary virtual asset address corresponding to the transfer of a virtual asset.

Meanwhile, whether the transaction identification value is included in the verification request messages 500 and 550 may be determined according to the type of the verification target. More specifically, if the verification is performed after the virtual asset is transferred, the transaction identification value may be included in the verification request messages 500 and 550.

For example, when an originator transferring the virtual asset and a beneficiary receiving the virtual asset are the same, if the type of a verification target is an originator, the transaction identification value may be included in the verification request messages 500 and 550. Alternatively, when the originator transferring the virtual asset and a beneficiary receiving the virtual asset are different, if the originating VASP server 140 verifies a beneficiary, the transaction identification value may be included in the verification request messages 500 and 550.

For another example, when an originator transferring the virtual asset and a beneficiary receiving the virtual asset are the same, if the type of a verification target is a beneficiary, transaction identification value may not be included in the verification request messages 500 and 550. Alternatively, when an originator transferring the virtual asset and a beneficiary receiving the virtual asset are different, if the beneficiary VASP server 120 verifies a beneficiary, the transaction identification value may not be included in the verification request messages 500 and 550. According to an example embodiment, the value "symbol" representing the type of virtual asset may represent an abbreviation or a symbol assigned to identify a unique name of the virtual asset, and may be used together with a token ticker. For example, the value representing the type of virtual asset may include "BTC," "ETH" or "XRP" depending on the type of virtual asset.

According to an example embodiment, the beneficiary virtual asset address "address" may indicate a wallet address to which the virtual asset is transferred, managed by the beneficiary VASP. Here, regardless of whether the type of a verification target is a beneficiary or an originator, the verification request messages 500 and 550 may include a beneficiary virtual asset address.

According to an example embodiment, the auxiliary virtual asset address "tag" may represent a secondary virtual asset address managed by the beneficiary VASP to which the virtual asset is transferred. Here, regardless of whether the type of a verification target is a beneficiary or an originator, the verification request messages 500 and 550 may include a auxiliary virtual asset address.

Further, whether the auxiliary virtual asset address is included in the verification request messages 500 and 550 may be determined according to the type of the virtual asset. For example, if the type of virtual asset is "XRP" of Ripple, the auxiliary virtual asset address, as the name of the destination tag, may be included in the verification request messages 500 and 550. Alternatively, if the type of virtual asset is EOS, XLM of Stellar Lumens or MED of MediBloc, the auxiliary virtual asset address may be included in the verification request messages 500 and 550 as the name of a memo. If the type of virtual asset is XEM or XLM of Stellar Lumens, the auxiliary virtual asset address may be included in the verification request messages 500 and 550 as the name of a memo.

According to an example embodiment, the hash salt value "hashSalt" may represent an arbitrary string used as an additional input when full name data or DOB data is hashed. Here, the hash salt value should be a randomly generated universally unique identifier (UUID) value for each request. For example, when hashing the full name data or the DOB data, the electronic device 100 may generate a hash value of a full name or a hash value of DOB by hashing after appending a hash salt value to each of the full name data and the DOB data.

According to an example embodiment, the hash value of DOB "dobHash" may indicate a value generated by hashing DOB data of a beneficiary or an originator. For example, the electronic device 100 may hash the DOB data in the format of "${YYYY}-${MM}-${DD}, ${hashSalt}" and generate a hash value of the DOB of a string type encoded in hexadecimal with a length of 64 characters. Here, in the case of a corporate account, the DOB may be set in the form of "0000-00-00."

According to an example embodiment, the hash value of a full name "nameHashes" may represent a value generated by hashing the full name data of the beneficiary or the originator. For example, if the full name data is expressed in English, the electronic device 100 may hash the full name data in the format "${lowercase(FirstName)}${lowercase(LastName)}, ${hashSalt}" to generate a hash value of a DOB of a string type encoded in hexadecimal with a length of 64 characters. Alternatively, if the full name data is expressed in a local language, the electronic device 100 may hash the full name data in the format "${FirstName}${LastName}, ${hashSalt}" to generate a DOB hash value of a character string encoded in hexadecimal with a length of 64 characters. Here, the electronic device 100 may hash the full name data after removing spaces included in the full name data and converting at least one character included in the full name data to a lowercase letter.

Meanwhile, as the electronic device 100 converts the data of the full name into various forms and then hashes it, the hash value of the full name may indicate a hash value set of full names including one or more hash values. For example, the electronic device 100 may generate a hash value by hashing full name information composed of a single entry in the order of first name and last name, or may generate a hash value by hashing full name information composed of a single entry in the order of last name and first name. Alternatively, the electronic device 100 may generate a hash value by hashing a Korean full name, or generate a hash value by hashing an English full name. This will be described in detail with reference to FIGS. 7A to 7H.

FIG. 5A illustrates the verification request message 500 according to the example embodiment.

According to the example embodiment, the verification request message 500 may include "UPBT001KR" as the code of the counterpart VASP.

According to the example embodiment, the verification request message 500 may include "VerifyOriginator" as a value representing the type of the verification target, and accordingly, the verification request message 500 may include a transaction identification value corresponding to the transfer of the virtual asset.

According to the example embodiment, the verification request message 500 may include "EHT" as a value indicating the type of virtual asset, and accordingly, the verification request message 500 may not include an auxiliary virtual asset address.

According to the example embodiment, the verification request message 500 may include four hash values as full name hash values.

FIG. 5B illustrates the verification request message 550 according to the example embodiment.

According to the example embodiment, the verification request message 550 may include "UPBT001KR" as the code of the counterpart VASP.

According to the example embodiment, the verification request message 550 may include "VerifyOriginator" as the value indicating the type of the verification target, and accordingly, the verification request message 550 may include a transaction identification value corresponding to the transfer of a virtual asset.

According to the example embodiment, the verification request message 550 may include "XRP" as a value indicating the type of virtual asset, and accordingly, the verification request message 550 may include "76188721" as an auxiliary virtual asset address.

According to the example embodiment, the verification request message 550 may include four hash values as full name hash values.

Figure 6:
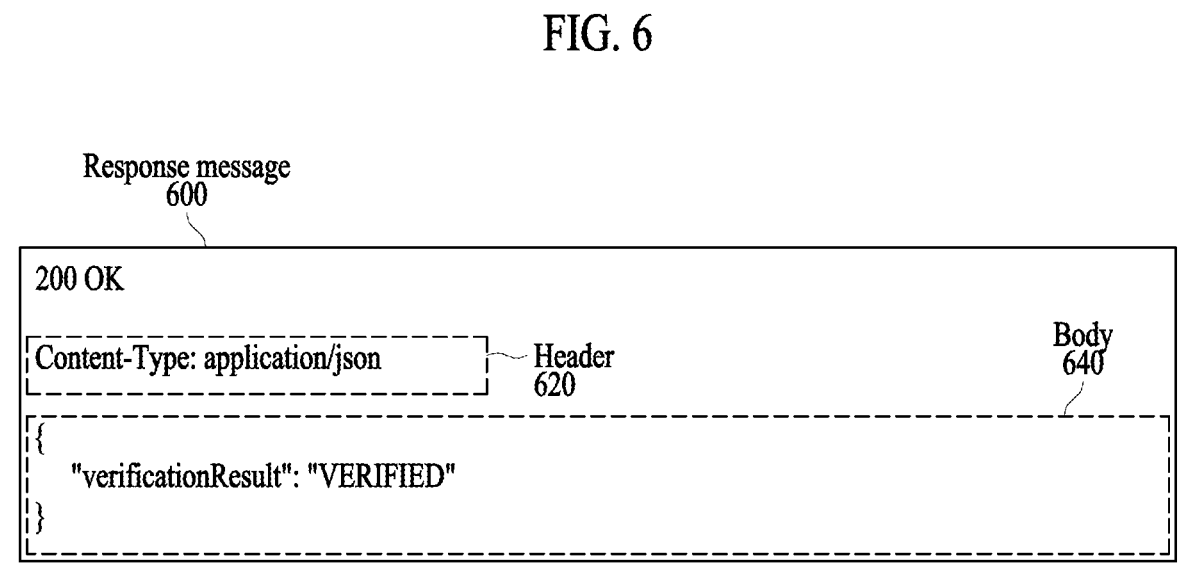

FIG. 6 illustrates an example of a response message 600 according to an example embodiment.

According to the example embodiment, the response message may include a header 620 or a body 640. Here, data included in the header 620 and the body 640 may be expressed as a string type based on the json format, but it is not limited thereto.

According to the example embodiment, the header 620 may include a value representing the type of content.

According to the example embodiment, the value indicating the type of content "Content-Type" may indicate the format of data included in the verification request message. For example, a value representing the type of content may be set to "application/json."

According to the example embodiment, the body 640 may include verification result information.

According to the example embodiment, verification result information "verificationResult" may indicate a verification determination value of the originator or the beneficiary generated based on the verification request message. For example, the verification result information may include a value "TXID-NOT-FOUND" indicating that a value matching the transaction identification value is not identified, a value "MISMATCH-ADDRESS" indicating that an address matching a beneficiary virtual asset address or an auxiliary virtual asset address is not identified, a value "MISMATCH-NAME" indicating that hash values of the full name mismatch, a value "MISMATCH-DOB" indicating that hash values of DOB mismatch, and/or a value "VERIFIED" indicating that an originator or a beneficiary is verified.

Here, if one or more mismatches are identified, the verification result information may include a value indicating one or more mismatches. For example, the verification result information may include "MISMATCH-NAME" and "MISMATCH-DOB."

Referring to FIG. 6, the response message 600 may include "VERIFIED" as verification result information according to the example embodiment.

FIGS. 7A to 7H are diagrams for explaining a process in which the VASP servers 120 and 140 identify whether hash values of full names match, according to the example embodiments.

Figure 7A:
FIGS. 7A to 7H are diagrams for explaining a process in which VASP servers identify whether hash values of full names match, according to example embodiments.

Referring to FIG. 7A, according to the example embodiment, the VASP servers 120 and 140 may identify whether a hash value of one full name of the originator matches a hash value of one full name of the beneficiary. For example, the electronic device 100 or the VASP servers 120 and 140 may generate a hash value of one full name of the originator by hashing after converting the full name data of the originator in a configured method. Further, the VASP servers 120 and 140 or the electronic device 100 may generate a hash value of one full name of the beneficiary by hashing after converting the full name data of the beneficiary in a configured method. Thereafter, if the hash value of one full name of the originator and the hash value of one full name of the beneficiary match, the VASP servers 120 and 140 may identify names of the beneficiary and the originator match.

According to an example embodiment, the electronic device 100 or the VASP servers 120 and 140 may convert the full name data according to a common method and then hash the data. For example, the electronic device 100 or the VASP servers 120 and 140 may remove spaces included in the full name data, convert at least one character included in the full name data to a lowercase letter, and hash the full name data. Alternatively, the electronic device 100 or the VASP servers 120 and 140 may convert the full name data into English and then hash the data. The electronic device 100 or the VASP servers 120 and 140 may, if the full name data includes a middle name, remove the middle name, convert to the first name and last name order, and then hash the data. However, the method of converting the full name data by the electronic device 100 or the VASP servers 120 and 140 to hash the full name data is not limited to the above.

Further, the operation of hashing the full name data may correspond to the operation of hashing the full name data of the originator by the electronic device 100 in operation S205 of FIG. 2A, the operation of the beneficiary VASP server 120 hashing the full name data of the beneficiary in operation S215 of FIG. 2A, the operation of the electronic device 100 hashing the full name data of the beneficiary in operation S260 of FIG. 2B, or the operation of the originating VASP server 140 hashing the full name data of the originator in operation S270 of FIG. 2B. Further, the operation of hashing full name data may correspond to the operation of the enclave server 102 hashing the full name data of the originator in operation S305 of FIG. 3A, the operation of the beneficiary VASP server 120 hashing the full name data of the beneficiary in operation S320 of FIG. 3A, the operation of the enclave server 106 hashing the full name data of the beneficiary in operation S360 of FIG. 3B, or the operation of the originating VASP server 140 hashing the full name data of the originator in operation S375 of FIG. 3B.

Figure 7B:
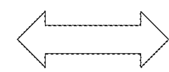

Referring to FIG. 7B, the VASP servers 120 and 140 may identify whether a hash value of one full name of the beneficiary matches one of hash values of a plurality of full names of an originator according to the example embodiment. For example, the electronic device 100 or the VASP servers 120 and 140 may generate a hash value set of the full name of the originator including hash values of the plurality of full names of the originator by converting and hashing the full name data of the originator in various ways. Further, the electronic device 100 or the VASP servers 120 and 140 may generate a hash value of one full name of the beneficiary by hashing after converting the full name data of the beneficiary in a configured method. Thereafter, if the hash value of one full name of the beneficiary matches one of hash values of the plurality of full names of the originator, the VASP servers 120 and 140 may identify that the full names of the beneficiary and the originator match.

According to an example embodiment, the electronic device 100 or the VASP servers 120 and 140 may hash after converting the full name data of the originator in various ways. For example, the electronic device 100 or the VASP servers 120 and 140 may convert the full name data of the originator into a single entry in order of first name and last name, and may hash after removing configured characters including at least some of spaces or hyphens (-) included in the full name data. Alternatively, the electronic device 100 or the VASP servers 120 and 140 may convert the full name data of the originator into a plurality of entries including a last name, a first name and at least one middle name, and may hash after converting a letter case of at least one character included in the full name data into a configured case (into a lowercase letter or an uppercase letter). However, the method of converting the full name data by the electronic device 100 or the VASP servers 120 and 140 to hash the full name data of the originator is not limited to the above.

Meanwhile, the operation of hashing the full name data of the originator may correspond to the operation of hashing the full name data of the originator by the electronic device 100 in operation S205 of FIG. 2A, the operation of hashing the full name data of the originator of the originating VASP server 140 in operation S270 of FIG. 2B, the operation of the enclave server 102 hashing the full name data of the originator in operation S305 of FIG. 3A, or the operation of the originating VASP server 140 hashing the full name data of the originator in operation S375 of FIG. 3B.

Figure 7C:
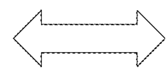

Referring to FIG. 7C, the VASP servers 120 and 140 may identify whether the hash value of one full name of the originator matches one of the hash values of a plurality of full names of the beneficiary according to the example embodiment. For example, the electronic device 100 or the VASP servers 120 and 140 may generate a hash value set of full name of the beneficiary including hash values of a plurality of the full names of the beneficiary by converting and hashing the full name data of the beneficiary in various ways. Further, the electronic device 100 or the VASP servers 120 and 140 may generate a hash value of one full name of the originator by hashing after converting the full name data of the originator in a configured method. Thereafter, if a hash value of one full name of the originator matches one of the hash values of the plurality of full names of the beneficiary, the VASP servers 120 and 140 may identify that names of the beneficiary and the originator match.

According to an example embodiment, the electronic device 100 or the VASP servers 120 and 140 may hash after converting the full name data of the beneficiary in various ways. For example, the electronic device 100 or the VASP servers 120 and 140 may convert the full name data of the beneficiary into a single entry in the order of last name and first name, and may remove a space included in the full name data, convert at least one character included in the full name data to a lowercase letter, and then hash the data. Alternatively, the electronic device 100 or the VASP servers 120 and 140 may combine a last name, a first name and at least one middle name included in the full name data of the beneficiary in various orders and convert them into a plurality of single entries, and hash after converting at least one character included in the full name data to a lowercase letter. However, the converting method by the electronic device 100 or the VASP servers 120 and 140 to hash the full name data of the beneficiary is not limited thereto.

Meanwhile, the operation of hashing the full name data of the beneficiary may correspond to the operation of the beneficiary VASP server 120 hashing the full name data of the beneficiary in operation S215 of FIG. 2A, the operation of the electronic device 100 hashing the full name data of the beneficiary in operation S260 of FIG. 2B, the operation of the beneficiary VASP server 120 hashing the full name data of the beneficiary in operation S320 of FIG. 3A, or the operation of the enclave server 106 hashing the full name data of the beneficiary in operation S360 of FIG. 3B.

Figure 7D:
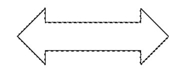

Referring to FIG. 7D, according to the example embodiment, the VASP servers 120 and 140 may identify whether one of the hash values of the plurality of full names of the originator matches one of the hash values of the plurality of full names of the beneficiary. For example, the electronic device 100 or the VASP servers 120 and 140 may hash after converting the full name data of the originator in various ways, and generate a hash value set of the full name of the originator including hash values of a plurality of names of the originator. Further, the electronic device 100 or the VASP servers 120 and 140 may hash after converting the full name data of the beneficiary in various ways, and generate a hash value set of full name of the beneficiary including the hash values of the plurality of full names of the beneficiary. Thereafter, if the hash values of the plurality of full names of the originator and the hash values of the plurality of full names of the beneficiary are equal to or greater than a configured value, the VASP servers 120 and 140 may identify that the names of the beneficiary and the originator match.

According to an example embodiment, the electronic device 100 or the VASP servers 120 and 140 may hash after converting the full name data of the originator or the full name data of the beneficiary in various ways. A more detailed operation of hashing the full name data by the electronic device 100 or the VASP servers 120 and 140 will be omitted since it overlaps the description of FIGS. 7A to 7C.

Meanwhile, the operation of hashing the full name data of the originator may correspond to the operation of hashing the full name data of the originator by the electronic device 100 in operation S205 of FIG. 2A, the operation of hashing the full name data of the originator of the originating VASP server 140 in operation S270 of FIG. 2B, the operation of the enclave server 102 hashing the full name data of the originator in operation S305 of FIG. 3A, or the operation of the originating VASP server 140 hashing the full name data of the originator in operation S375 of FIG. 3B. Further, the operation of hashing the full name data of the beneficiary may correspond to the operation of the beneficiary VASP server 120 hashing the full name data of the beneficiary in operation S215 of FIG. 2A, the operation of the electronic device 100 hashing the full name data of the beneficiary in operation S260 of FIG. 2B, the operation of the beneficiary VASP server 120 hashing the full name data of the beneficiary in operation S320 of FIG. 3A, or the operation of the enclave server 106 hashing the full name data of the beneficiary in operation S360 of FIG. 3B.

Figure 7E:
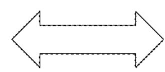

Referring to FIG. 7E, according to the example embodiment, the VASP servers 120 and 140 may identify whether a hash value of one full name of the first beneficiary matches a hash value of one full name of the second beneficiary. For example, the electronic device 100 may generate a hash value of one full name of the first beneficiary by hashing after converting the full name data of the first beneficiary in a configured method. Further, the VASP servers 120 and 140 may generate a hash value of one full name of the second beneficiary by hashing after converting the full name data of the second beneficiary in a configured method. Thereafter, if the hash value of one full name of the first beneficiary and the hash value of one full name of the second beneficiary match, the VASP servers 120 and 140 may identify that the full names of the beneficiary match.

According to an example embodiment, the electronic device 100 or the VASP servers 120 and 140 may hash after converting the full name data according to a common method. A more detailed operation of hashing the full name data by the electronic device 100 or the VASP servers 120 and 140 will be omitted since it overlaps the description of FIGS. 7A to 7C.

Meanwhile, the operation of hashing the full name data may correspond to the operation of hashing the full name data of the beneficiary by the electronic device 100 in operation S410 of FIG. 4A, the operation of the beneficiary VASP server 120 hashing the full name data of the beneficiary in operation S420 of FIG. 4A, the operation of hashing the full name data of the beneficiary by the electronic device 100 in operation S460 of FIG. 4B, or the operation of hashing the full name data of the beneficiary by the originating VASP server 140 in operation S470 of FIG. 4B.

Figure 7F:

Referring to FIG. 7F, according to the example embodiment, the VASP servers 120 and 140 may identify whether a hash value of one full name of the second beneficiary matches one of hash values of a plurality of full names of the first beneficiary. For example, the electronic device 100 may generate a hash value set of the full name of the first beneficiary including hash values of a plurality of full names of the first beneficiary by converting and hashing the full name data of the first beneficiary in various ways. Further, the VASP servers 120 and 140 may generate hash value of one full name of the second beneficiary by hashing after converting the full name data of the second beneficiary in a set manner. Thereafter, if the hash value of one full name of the second beneficiary matches one of the hash values of the plurality of full names of the first beneficiary, the VASP servers 120 and 140 may identify that the full names of the beneficiary match.

According to an example embodiment, the electronic device 100 may convert the full name data of the first beneficiary according to various methods and then hash the data. A more detailed operation of hashing the full name data by the electronic device 100 will be omitted since it overlaps the description of FIGS. 7A to 7C.

Meanwhile, the operation of hashing the full name data of the first beneficiary may correspond to the operation of hashing the full name data of the beneficiary by the electronic device 100 in operation S410 of FIG. 4A, or the operation of hashing the full name data of the beneficiary by the electronic device 100 in operation S460 of FIG. 4B.

Figure 7G:
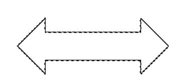

Referring to FIG. 7G, according to the example embodiment, the VASP servers 120 and 140 may identify whether a hash value of one full name of the first beneficiary matches one of the hash values of a plurality of full names of the second beneficiary. For example, the VASP servers 120 and 140 may hash after converting the full name data of the second beneficiary in various ways, and generate a hash value set of the full name of the second beneficiary including hash values of a plurality of full names of the second beneficiary. Further, after converting the full name data of the first beneficiary in a configured method, the electronic device 100 may hash the data, and may generate a hash value of one full name of the first beneficiary. Thereafter, if the hash value of one full name of the first beneficiary matches one of the hash values of the plurality of full names of the second beneficiary, the VASP servers 120 and 140 may identify that the full names of the beneficiary match.

According to an example embodiment, the VASP servers 120 and 140 may convert the full name data of the second beneficiary according to various method and then hash the data. A more specific operation of hashing the full name data by the VASP servers 120 and 140 will be omitted since it overlaps the description of FIGS. 7A to 7C.

Meanwhile, the operation of hashing the full name data of the second beneficiary may correspond to the operation of the beneficiary VASP server 120 hashing the full name data of the beneficiary in operation S420 of FIG. 4A, or the operation of the originating VASP server 140 hashing the full name data of the beneficiary in operation S470 of FIG. 4B.

Figure 7H:
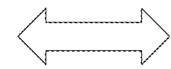

Referring to FIG. 7H, according to the example embodiment, the VASP servers 120 and 140 may identify whether one of the hash values of the plurality of full names of the first beneficiary matches one of the hash values of the plurality of full names of the second beneficiary. For example, the electronic device 100 may convert the full name data of the first beneficiary in various ways and then hash the data, and generate a hash value set of the full name of the first beneficiary including hash values of a plurality of full names of the first beneficiary. Further, after converting the full name data of the second beneficiary in various ways, the VASP servers 120 and 140 may hash the data, and generate a hash value set of the full name of the second beneficiary including hash values of a plurality of full names of the second beneficiary. Thereafter, if a hash value among the plurality of full names of the first beneficiary and the hash values of the plurality of full names of the second beneficiary is equal to or greater than a configured value, the VASP servers 120 and 140 may identify that the full names of the beneficiary match.

According to an example embodiment, after converting the full name data of the first beneficiary or the full name data of the second beneficiary in various ways, the electronic device 100 or the VASP servers 120 and 140 may perform hashing. A more specific operation of hashing the full name data by the VASP servers 120 and 140 will be omitted since it overlaps the description of FIGS. 7A to 7C.

Meanwhile, the operation of hashing the full name data of the first beneficiary may correspond to the operation of hashing the full name data of the beneficiary by the electronic device 100 in operation S410 of FIG. 4A, or the operation of hashing the full name data of the beneficiary by the electronic device 100 in operation S460 of FIG. 4B. Further, the operation of hashing the full name data of the second beneficiary may correspond to the operation of the beneficiary VASP server 120 hashing the full name data of the beneficiary in operation S420 of FIG. 4A, or the operation of the originating VASP server 140 hashing the full name data of the beneficiary in operation S470 of FIG. 4B.

Figure 8:
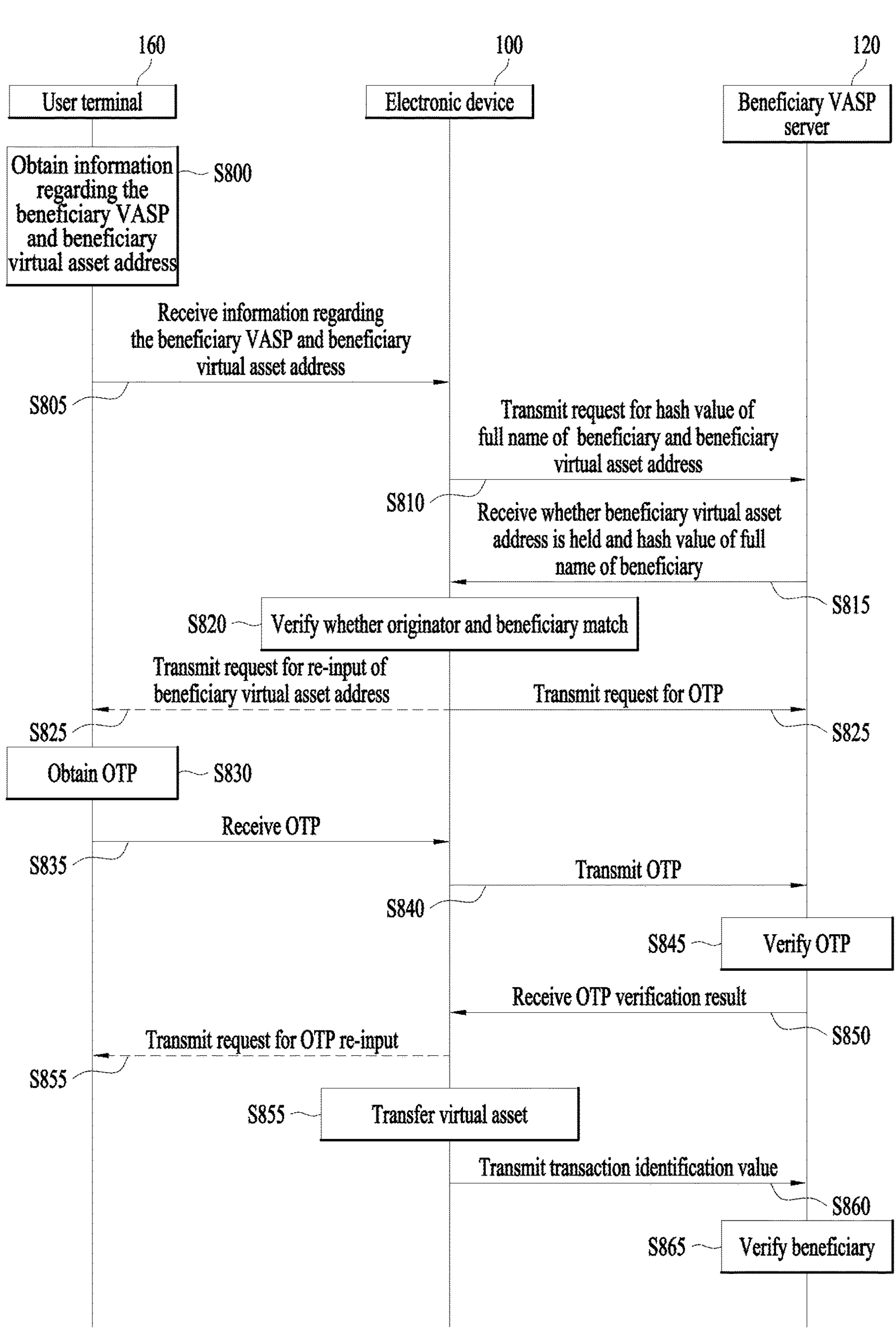
FIG. 8 is a flowchart for explaining a process of verifying a beneficiary by an electronic device according to an example embodiment.

FIG. 8 is a flowchart for explaining a process of verifying a beneficiary by the electronic device 100 according to the example embodiment. Here, the electronic device 100 may refer to a server existing inside the originating VASP.

According to an example embodiment, a user may transfer a virtual asset in his/her wallet managed by the originating VASP to the user's wallet managed by the beneficiary VASP using the user terminal 160. In other words, the originator that transfers the virtual asset and the beneficiary that receives the virtual asset may be the same.

In operation S800, according to the example embodiment, the user terminal 160 may obtain information regarding the beneficiary VASP and a beneficiary virtual asset address. For example, the user terminal 160 may obtain a user input related to information regarding the beneficiary virtual asset address to which the virtual asset is to be transferred and the beneficiary VASP that manages the beneficiary virtual asset address.

In operation S805, according to the example embodiment, the electronic device 100 may receive information regarding the beneficiary VASP and the beneficiary virtual asset address from the user terminal 160. For example, the user terminal 160 may transmit information regarding the beneficiary virtual asset address that is input by the user and the beneficiary VASP that manages the beneficiary virtual asset address, to the electronic device 100.

In operation S810, the electronic device 100 may transmit a request for a hash value of the full name of the beneficiary and a beneficiary virtual asset address to the beneficiary VASP server 120 according to the example embodiment. For example, while transmitting the beneficiary virtual asset address to the beneficiary VASP server 120, the electronic device 100 may request the beneficiary VASP server 120 to transmit the hash value of the full name of the beneficiary corresponding to the beneficiary virtual asset address.

In operation S815, the electronic device 100 may receive, from the beneficiary VASP server 120, whether the beneficiary virtual asset address is held and a hash value of a full name of the beneficiary according to the example embodiment. For example, the beneficiary VASP server 120 may identify whether there is an address matching the beneficiary virtual asset address. Thereafter, the beneficiary VASP server 120 may identify the full name data of the beneficiary corresponding to the beneficiary virtual asset address, hash the full name data of the beneficiary, and generate a hash value of the full name of the beneficiary. The beneficiary VASP server 120 may transmit to the electronic device 100 whether there is an address matching the beneficiary virtual asset address and a hash value of the full name of the beneficiary.

According to an example embodiment, the beneficiary VASP server 120 may identify whether there is an address matching the beneficiary virtual asset address or an auxiliary virtual asset address. For example, the beneficiary VASP server 120 may identify whether an address identical to the beneficiary virtual asset address received from the electronic device 100 exists in the database. Alternatively, if the beneficiary VASP server 120 also receives an auxiliary virtual asset address from the electronic device 100, the beneficiary VASP server 120 may identify whether there is an address matching the beneficiary virtual asset address and the auxiliary virtual asset address in the database.

According to an example embodiment, the beneficiary VASP server 120 may identify the full name data of the beneficiary. For example, if it is identified that an address matching the beneficiary virtual asset address exists in the database, the beneficiary VASP server 120 may identify the full name data of the beneficiary corresponding to the beneficiary virtual asset address.

According to an example embodiment, the beneficiary VASP server 120 may generate hash values of one or more full names of the beneficiary. A more detailed operation in which the beneficiary VASP server 120 generates hash values of one or more full names of the beneficiary is omitted since it overlaps the description of FIGS. 7A to 7H.

In operation S820, the electronic device 100 may verify whether an originator and a beneficiary match according to the example embodiment. For example, the electronic device 100 may identify full name data of the originator, hash the full name data of the originator, and generate a hash value of the originator' full name. Thereafter, the electronic device 100 may identify whether the hash value of the full name of the beneficiary received from the beneficiary VASP server 120 matches he hash value of the full name of the originator. A more detailed operation of the electronic device 100 verifying whether the originator and the beneficiary match will be omitted since it overlaps the description of FIGS. 7A to 7H.

In operation S825, if the originator and the beneficiary match, the electronic device 100 may transmit a request for one time password (OTP) issuance to the beneficiary VASP server 120 according to the example embodiment. Alternatively, if the originator and the beneficiary do not match, the electronic device 100 may transmit a request for re-input of the beneficiary virtual asset address to the user terminal 160 according to the example embodiment. However, the OTP is only an example, and it will be apparent to those skilled in the art that various types of passwords may be used.

In operation S830, the electronic device 100 may obtain an OTP according to the example embodiment. For example, if the originator and the beneficiary match, the beneficiary VASP server 120 may issue an OTP and provide the OTP to the user's beneficiary VASP account. Thereafter, a user may input the issued OTP into the user terminal 160.

In operation S835, the electronic device 100 may receive the OTP from the user terminal 160 according to the example embodiment. For example, the user terminal 160 may transmit the OTP input by the user to the electronic device 100.

In operation S840, the electronic device 100 may transmit the OTP to the beneficiary VASP server 120 according to the example embodiment. For example, the electronic device 100 may transmit the OTP received from the user terminal 160 to the beneficiary VASP server 120.

In operation S845, the beneficiary VASP server 120 may verify the OTP. For example, the beneficiary VASP server 120 may identify whether the OTP issued by itself and the OTP that is input by the user match.

In operation S850, the electronic device 100 may receive the OTP verification result from the beneficiary VASP server 120. For example, from the beneficiary VASP server 120, the electronic device 100 may receive a value (true) indicating that the OTP issued by the beneficiary VASP server 120 matches the OTP that is input by the user, or a value (false) indicating that the OTP issued by the beneficiary VASP server 120 and the OTP entered by the user do not match.

In operation S855, if the OTP issued by the beneficiary VASP server 120 matches to the OTP entered by the user, the electronic device 100 may transfer the virtual asset according to the example embodiment. Alternatively, if the OTP issued by the beneficiary VASP server 120 and the OTP entered by the user do not match, the electronic device 100 may transmit a request for an OTP re-input to the user terminal 160 according to the example embodiment.

In operation S860, if the electronic device 100 transfers the virtual asset, the electronic device 100 may transmit an identification value of the transaction to the beneficiary VASP server 120 according to the example embodiment. For example, the electronic device 100 may transmit the identification value of the transaction corresponding to the transfer of the virtual asset to the beneficiary VASP server 120. However, operation S860 may be omitted.

In operation S865, the beneficiary VASP server 120 may reflect the transferred virtual asset to the balance of the beneficiary virtual asset address according to the example embodiment. For example, based on the transaction identification value, the beneficiary VASP server 120 may reflect the transferred virtual asset to the balance of the beneficiary virtual asset address at every configured time or whenever a response message is received.

Figure 9:
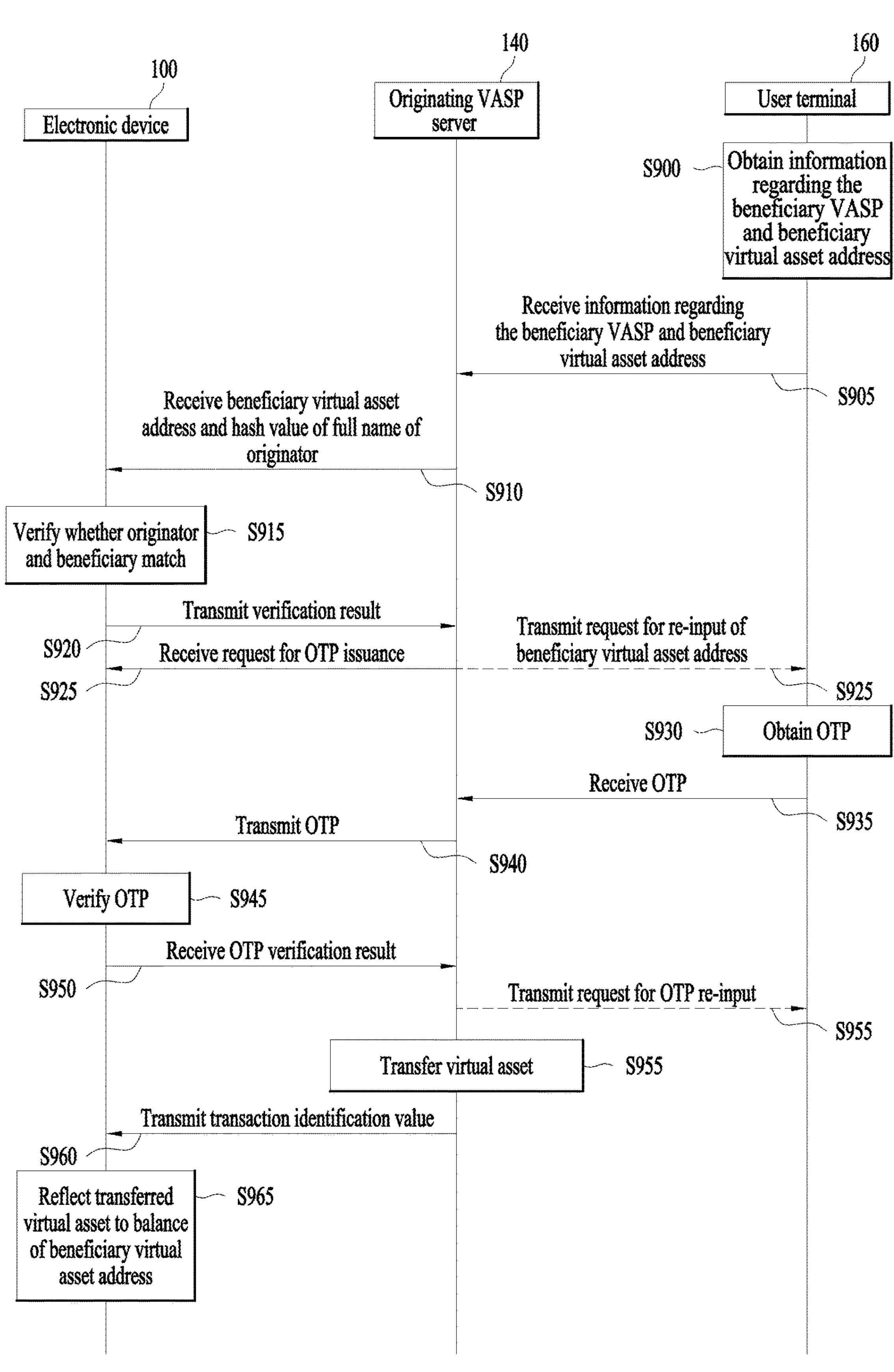
FIG. 9 is a flowchart for explaining a process of verifying an originator by an electronic device according to an example embodiment.

FIG. 9 is a flowchart for explaining a process of verifying an originator by the electronic device 100 according to the example embodiment. Here, the electronic device 100 may refer to a server existing inside the beneficiary VASP.

According to an example embodiment, a user may transfer a virtual asset in his/her wallet managed by the originating VASP to the user's wallet managed by the beneficiary VASP using the user terminal 160. In other words, the originator that transfers the virtual asset and the beneficiary that receives the virtual asset may be the same.

In operation S900, the user terminal 160 may obtain information regarding the beneficiary VASP and a beneficiary virtual asset address according to the example embodiment. For example, the user terminal 160 may obtain a user input related to information regarding the beneficiary virtual asset address to which the virtual asset are to be transferred and the beneficiary VASP that manages the beneficiary virtual asset address.

In operation S905, the originating VASP server 140 may receive information regarding the beneficiary VASP and the beneficiary virtual asset address from the user terminal 160 according to the example embodiment. For example, the user terminal 160 may transmit information regarding the beneficiary virtual asset address that is input by the user and the beneficiary VASP that manages the beneficiary virtual asset address to the originating VASP server 140.

In operation S910, the electronic device 100 may receive the beneficiary virtual asset address and a hash value of the full name of the originator from the originating VASP server 140 according to the example embodiment. For example, the originating VASP server 140 may generate a hash value of the full name of the originator by hashing the full name data of the originator. Thereafter, the originating VASP server 140 may transmit a beneficiary virtual asset address and a hash value of the full name of the originator to the electronic device 100.

According to an example embodiment, the originating VASP server 140 may generate a hash value of one or more full names of the originator. A more detailed operation in which the originating VASP server 140 generates hash values of one or more names of the originator is omitted since it overlaps the description of FIGS. 7A to 7H.

In operation S915, the electronic device 100 may verify whether the originator and the beneficiary match according to the example embodiment. For example, the electronic device 100 may identify whether there is an address matching the beneficiary virtual asset address. Thereafter, the electronic device 100 may identify full name data of the beneficiary corresponding to the beneficiary virtual asset address, hash the full name data of the beneficiary, and generate a hash value of the full name of the beneficiary. The electronic device 100 may identify whether the hash value of the full name of the beneficiary matches the hash value of the full name of the originator.

According to an example embodiment, the electronic device 100 may identify whether there is an address matching the beneficiary virtual asset address or an auxiliary virtual asset address. For example, the electronic device 100 may identify whether an address matching the beneficiary virtual asset address received from the originating VASP server 140 exists in the database. Alternatively, if the electronic device 100 also receives an auxiliary virtual asset address from the originating VASP server 140, the electronic device 100 may identify whether there is an address matching the beneficiary virtual asset address and the auxiliary virtual asset address in the database.

According to an example embodiment, the electronic device 100 may identify the full name data of the beneficiary. For example, if it is identified that there is an address matching the beneficiary virtual asset address in the database, the electronic device 100 may identify the full name data of the beneficiary corresponding to the beneficiary virtual asset address.

According to the example embodiment, the electronic device 100 may generate hash values of one or more full names of the beneficiary. A more specific operation of generating hash values of one or more full names of beneficiary by the electronic device 100 is omitted since it overlaps the description of FIGS. 7A to 7H.

According to an example embodiment, the electronic device 100 may identify whether the hash values of one or more full names of the beneficiary match the hash values of one or more full names of originator. A more specific operation of the electronic device 100 verifying whether the originator and the beneficiary match will be omitted since it overlaps the description of FIGS. 7A to 7H.

In operation S920, the electronic device 100 may transmit the verification result to the originating VASP server 140. For example, to the originating VASP server 140, the electronic device 100 may transmit a value indicating that there is no address matching the beneficiary virtual asset address or the auxiliary virtual asset address. Alternatively, to the originating VASP server 140, the electronic device 100 may transmit a value (true) indicating that the hash value of the full name of the originator matches the hash value of the full name of the beneficiary, or a value (false) indicating that the hash value of the full name of the originator and the hash value of the full name of the beneficiary do not match.

In operation S925, if the originator and the beneficiary match, the electronic device 100 may receive a request for OTP issuance from the originating VASP server 140 according to the example embodiment. Alternatively, if the originator and the beneficiary do not match, the originating VASP server 140 may transmit a request for re-input of the beneficiary virtual asset address to the user terminal 160 according to the example embodiment. However, it is an example, and it will be apparent to those skilled in the art that various types of passwords may be used.

In operation S930, the electronic device 100 may obtain an OTP according to the example embodiment. For example, if the originator and the beneficiary match, the electronic device 100 may issue an OTP and provide the OTP to the user's beneficiary VASP account. Thereafter, a user may input the issued OTP into the user terminal 160.

In operation S935, the originating VASP server 140 may receive the OTP from the user terminal 160 according to the example embodiment. For example, the user terminal 160 may transmit the OTP that is input by the user to the originating VASP server 140.

In operation S940, the electronic device 100 may receive the OTP from the originating VASP server 140 according to the example embodiment. For example, the originating VASP server 140 may transmit the OTP received from the user terminal 160 to the electronic device 100.

In operation S945, the electronic device 100 may verify the OTP. For example, the electronic device 100 may identify whether the OTP issued by the electronic device 100 itself matches the OTP that is input by the user.

In operation S950, the electronic device 100 may transmit the OTP verification result to the originating VASP server 140. For example, to the originating VASP server 140, the electronic device 100 may transmit a value (true) indicating that the OTP issued by the electronic device 100 itself matches the OTP that is input by the user, or a value (false) indicating that the OTP issued by the electronic device 100 itself and the OTP entered by the user do not match.

In operation S955, if the OTP issued by the electronic device 100 and the OTP that is input by the user match, the originating VASP server 140 may transfer the virtual asset according to the example embodiment. Alternatively, if the OTP issued by the electronic device 100 and the OTP that is input by the user do not match, the originating VASP server 140 may transmit a request for OTP re-input to the user terminal 160 according to the example embodiment.

In operation S960, if the originating VASP server 140 transfers the virtual asset, the electronic device 100 may receive an identification value of the transaction from the originating VASP server 140 according to the example embodiment. For example, the electronic device 100 may receive, from the originating VASP server 140, the identification value of the transaction corresponding to the transfer of the virtual asset. However, operation S960 may be omitted.

In operation S965, the electronic device 100 may reflect the transferred virtual asset to the balance of the beneficiary virtual asset address according to the example embodiment. For example, based on the transaction identification value, the electronic device 100 may reflect the transferred virtual asset to the balance of the beneficiary virtual asset address at every configured time or whenever a response message is received.

Figure 10:
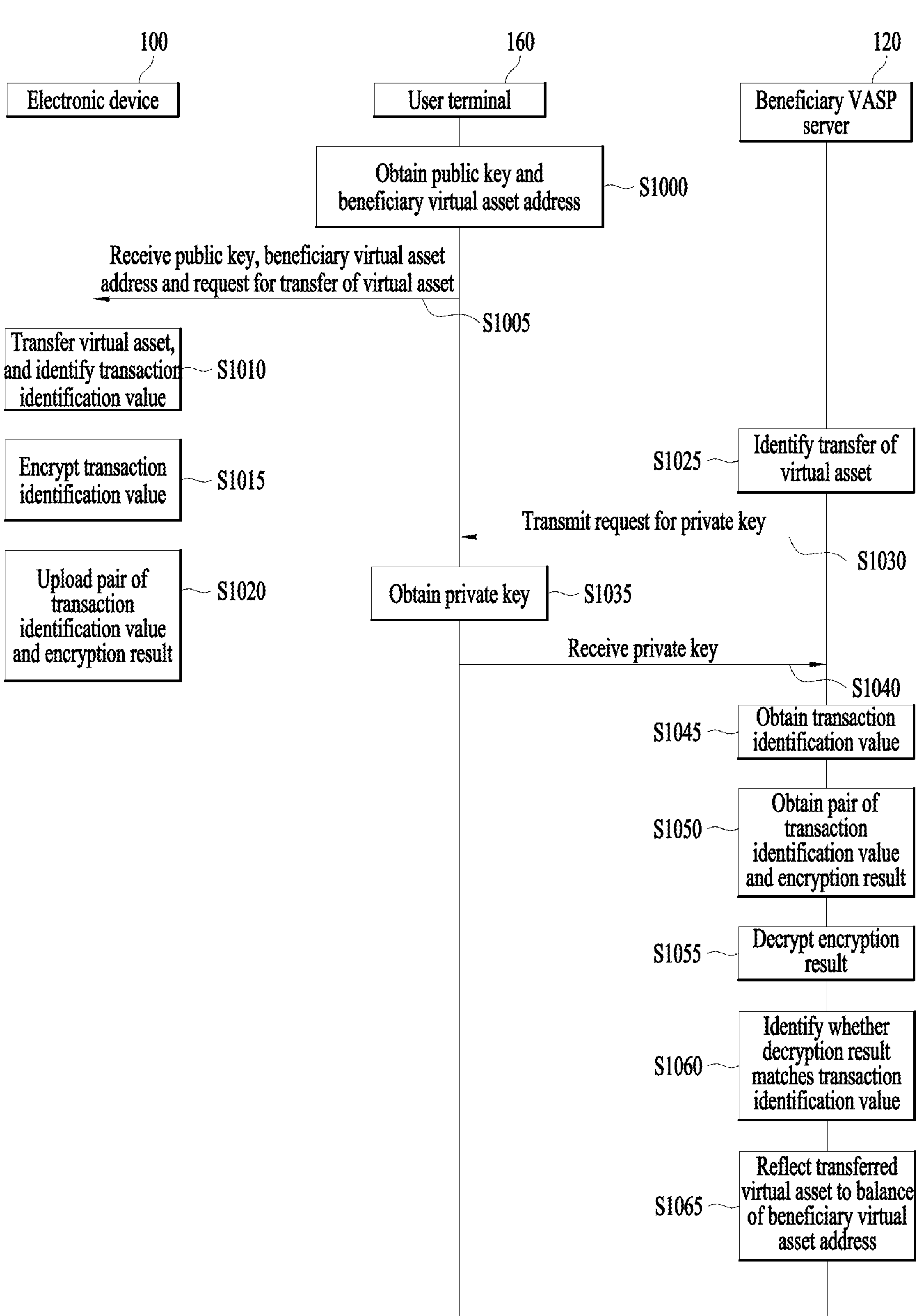
FIG. 10 is a flowchart for explaining a process of verifying a beneficiary by an electronic device according to an example embodiment.

FIG. 10 is a flowchart for explaining a process of verifying a beneficiary by the electronic device 100 according to the example embodiment. Here, the electronic device 100 may refer to a server existing inside the originating VASP.

According to an example embodiment, a user may transfer a virtual asset in his/her wallet managed by the originating VASP to the user's wallet managed by the beneficiary VASP using the user terminal 160. In other words, the originator that transfers the virtual asset and the beneficiary that receives the virtual asset may be the same.

In operation S1000, the user terminal 160 may obtain a public key and a beneficiary virtual asset address according to the example embodiment. For example, the user terminal 160 may obtain a user input on a public key from a generated pair of the public key and a private key. Alternatively, the user terminal 160 may obtain a user input related to information regarding a beneficiary virtual asset address to which the virtual asset is to be transferred and the beneficiary VASP that manages the beneficiary virtual asset address.

In operation S1005, according to the example embodiment, from the user terminal 160, the electronic device 100 may receive the public key, the beneficiary virtual asset address and a request for transfer of a virtual asset to the beneficiary virtual asset address. For example, while transmitting the public key and the beneficiary virtual asset address to the electronic device 100, the user terminal 160 may request to transfer the virtual asset to the beneficiary virtual asset address.

In operation S1010, the electronic device 100 may transfer the virtual asset, and identify a transaction identification value according to the example embodiment. For example, the electronic device 100 may transmit the virtual asset to the beneficiary virtual asset address, and identify the transaction identification value corresponding to the transfer of the virtual asset.

In operation S1015, the electronic device 100 may encrypt the transaction identification value according to the example embodiment. For example, the electronic device 100 may encrypt the transaction identification value using the public key received from the user terminal 160, and obtain an encryption result or cypher text.

In operation S1020, the electronic device 100 may upload a pair of the transaction identification value and the encryption result to an open server according to the example embodiment. For example, the electronic device 100 may upload the pair of the transaction identification value and the encryption result to a web server accessible to all VASP servers.

In operation S1025, the beneficiary VASP server 120 may identify the virtual asset transferred to the beneficiary virtual asset address according to the example embodiment. For example, the beneficiary VASP server 120 may identify the virtual asset or deposit transferred by the electronic device 100 to the beneficiary virtual asset address.

In operation S1030, the beneficiary VASP server 120 may transmit a request for a private key to the user terminal 160 according to the example embodiment. For example, the beneficiary VASP server 120 may request the user terminal 160 to obtain and transmit the private key.

In operation S1035, the user terminal 160 may obtain the private key according to the example embodiment. For example, the user terminal 160 may display a pop-up window for inputting a private key on the display of the user terminal 160, and obtain a user input for writing the private key.

In operation S1040, the beneficiary VASP server 120 may receive the private key from the user terminal 160 according to the example embodiment. For example, the user terminal 160 may transmit the private key that is input by the user to the beneficiary VASP server 120.

Meanwhile, it is described that operation S1025 to operation S1040 are performed after operation S1015 and operation S1020, but it is an example. For example, operation S1015 and operation S1020, and operation S1025 to operation S1040 may be performed in parallel, or operation S1015 and operation S1020 may be performed after operation S1025 to operation S1040 are performed.

In operation S1045, the beneficiary VASP server 120 may obtain a transaction identification value according to the example embodiment. For example, the beneficiary VASP server 120 may load a transaction identification value based on the beneficiary virtual asset address.

In operation S1050, according to the example embodiment, the beneficiary VASP server 120 may obtain the pair of transaction identification value and the encryption result from the open server. For example, the beneficiary VASP server 120 may retrieve the obtained transaction identification value from the web server, and load the pair of the transaction identification value and the encryption result.

Meanwhile, it is described that operation S1030 to operation S1040 are performed, and then operation S1045 and operation S1050 are performed, but it is an example. For example, operation S1030 to operation S1040, and operation S1045 and operation S1050 may be performed in parallel, or operation S1030 to operation S1040 may be performed after operation S1045 and operation S1050 are performed.

In operation S1055, beneficiary VASP server 120 may decrypt the encryption result according to the example embodiment. For example, the beneficiary VASP server 120 may decrypt the encryption result using the obtained private key.

In operation S1060, the beneficiary VASP server 120 may identify whether the decryption result matches the transaction identification value according to the example embodiment.

Meanwhile, FIG. 10 illustrates that the electronic device 100 or the beneficiary VASP server 120 encrypts or decrypts a transaction identification value, and identify a match/mismatch, but it is an example, and it is not limited to the above. For example, in FIG. 10, the electronic device 100 or the beneficiary VASP server 120 may encrypt or decrypt full name data or DOB data, and identify a match/mismatch.

In operation S1065, the beneficiary VASP server 120 may reflect the transferred virtual asset to the balance of the beneficiary virtual asset address according to the example embodiment. For example, based on the transaction identification value, the beneficiary VASP server 120 may reflect the virtual asset transferred at every configured time or whenever a response message is received, to the balance of the beneficiary virtual asset address.

Figure 11:
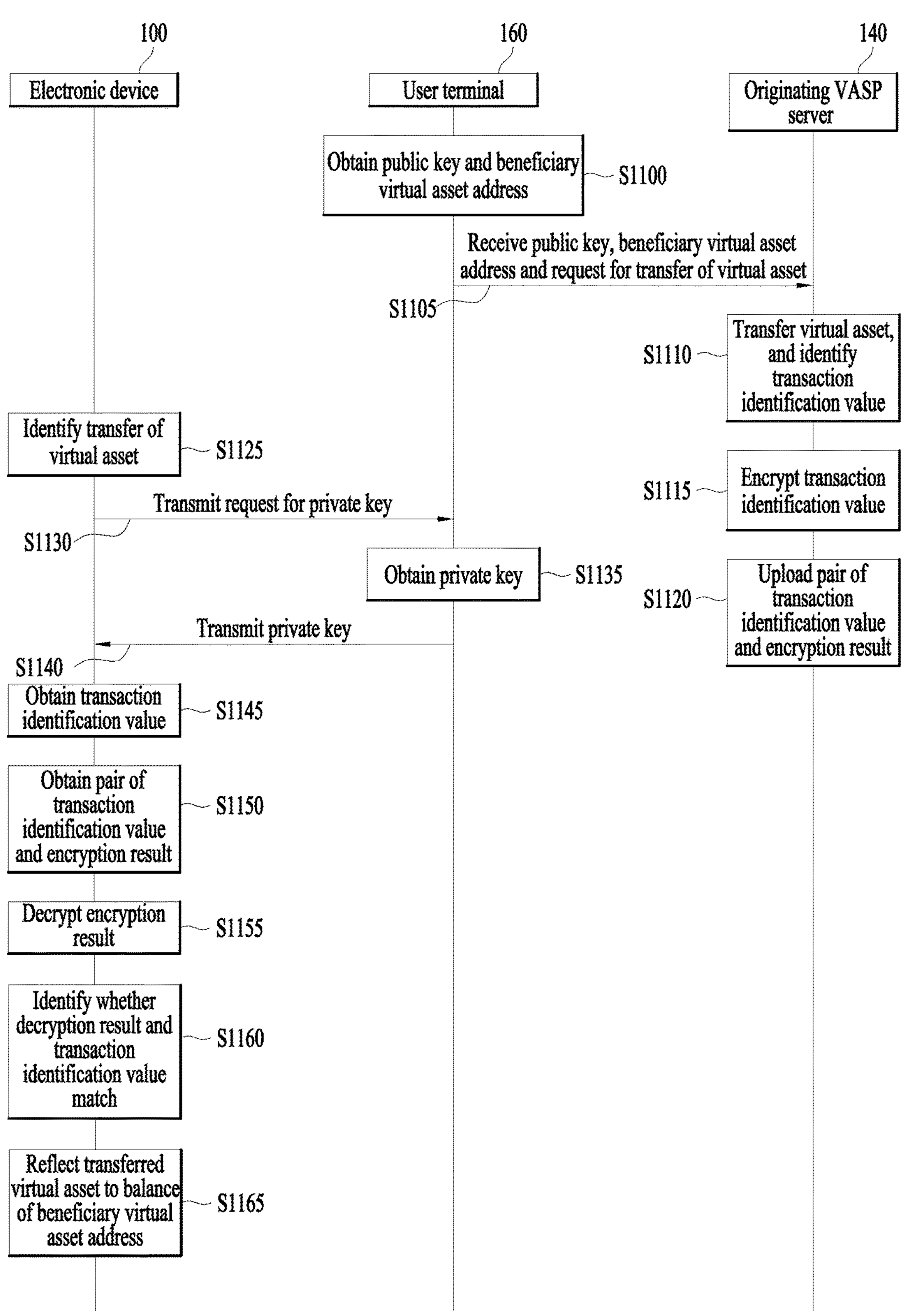
FIG. 11 is a flowchart for explaining a process of verifying an originator by an electronic device according to an example embodiment.

FIG. 11 is a flowchart for explaining a process of verifying an originator by the electronic device 100 according to the example embodiment. Here, the electronic device 100 may refer to a server existing inside the beneficiary VASP.

According to an example embodiment, a user may transfer a virtual asset in his/her wallet managed by the originating VASP to the user's wallet managed by the beneficiary VASP using the user terminal 160. In other words, the originator that transfers the virtual asset and the beneficiary that receives the virtual asset may be the same.

In operation S1100, the user terminal 160 may obtain a public key and a beneficiary virtual asset address according to the example embodiment. For example, the user terminal 160 may obtain a user input on a public key from a generated pair of the public key and a private key. Further, the user terminal 160 may obtain a user input related to information regarding the beneficiary virtual asset address to which the virtual asset is to be transferred and the beneficiary VASP that manages the beneficiary virtual asset address.

In operation S1105, according to the example embodiment, from the user terminal 160, the originating VASP server 140 may receive the public key, the beneficiary virtual asset address, and a request for transfer of a virtual asset to the beneficiary virtual asset address. For example, while transmitting the public key and the beneficiary virtual asset address to the originating VASP server 140, the user terminal 160 may request to transfer the virtual asset to the beneficiary virtual asset address.

In operation S1110, the originating VASP server 140 may transfer the virtual asset, and identify a transaction identification value according to the example embodiment. For example, the originating VASP server 140 may transfer the virtual asset to the beneficiary virtual asset address, and may identify the transaction identification value corresponding to the transfer of the virtual asset.

In operation S1115, the originating VASP server 140 may encrypt the transaction identification value according to the example embodiment. For example, the originating VASP server 140 may encrypt the transaction identification value by using the public key received from the user terminal 160, and obtain an encryption result or cypher text.

In operation S1120, the originating VASP server 140 may upload a pair of the transaction identification value and the encryption result to an open server according to the example embodiment. For example, the originating VASP server 140 may upload the pair of the transaction identification value and the encryption result to a web server accessible to all VASP servers.

In operation S1125, the electronic device 100 may identify the virtual asset transferred to the beneficiary virtual asset address according to the example embodiment. For example, the electronic device 100 identify the virtual asset or deposit transferred by the originating VASP server 140 to the beneficiary virtual asset address.

In operation S1130, the electronic device 100 may transmit a request for a private key to the user terminal 160 according to the example embodiment. For example, the electronic device 100 may request the user terminal 160 to obtain and transmit the private key.

In operation S1135, the user terminal 160 may obtain the private key according to the example embodiment. For example, the user terminal 160 may display a pop-up window for inputting a private key on the display of the user terminal 160, and obtain a user input for writing a private key.

In operation S1140, the electronic device 100 may receive the private key from the user terminal 160 according to the example embodiment. For example, the user terminal 160 may transmit the private key input by the user to the electronic device 100.

Meanwhile, it is described that after operation S1115 and operation S1120 are performed, operation S1125 to operation S1140 are performed, but it is an example. For example, operation S1115 and operation S1120, and operation S1125 to operation S1140 may be performed in parallel, or operation S1115 and operation S1120 may be performed after operation S1125 to operation S1140 are performed.

In operation S1145, the electronic device 100 may obtain the transaction identification value according to the example embodiment. For example, the electronic device 100 may load the transaction identification value based on the beneficiary virtual asset address.

In operation S1150, the electronic device 100 may obtain a pair of the transaction identification value and the encryption result from the open server according to the example embodiment. For example, the electronic device 100 may retrieve the obtained transaction identification value from the web server and load the pair of the transaction identification value and the encryption result from the web server.

Meanwhile, it is described that operation S1130 to operation S1140 are performed, and then operation S1145 and operation S1150 are performed, but it is an example. For example, operation S1130 to operation S1140, and operation S1145 and operation S1150 may be performed in parallel, or operation S1130 to operation S1140 may be performed after operation S1145 and operation S1150 are performed.

In operation S1155, the electronic device 100 may decrypt the encryption result according to the example embodiment. For example, the electronic device 100 may decrypt the encryption result using the obtained private key.

In operation S1160, the electronic device 100 may identify whether the decryption result and the transaction identification value match according to the example embodiment.

Meanwhile, FIG. 11 illustrates that the electronic device 100 or the originating VASP server 140 encrypts or decrypts the transaction identification value, and identifies a match/mismatch, but it is an example, and it is not limited to the above. For example, with regard to FIG. 11, the electronic device 100 or the originating VASP server 140 may encrypt or decrypt full name data or DOB data, and identify a match/mismatch.

In operation S1165, the electronic device 100 may reflect the transferred virtual asset to the balance of the beneficiary virtual asset address according to the example embodiment. For example, based on the transaction identification value, the electronic device 100 may reflect the transferred virtual asset to the balance of the beneficiary virtual asset address at every configured time or whenever a response message is received.

Meanwhile, in order to more strictly verity transmission and reception, the electronic device 100, the beneficiary VASP server 120, the originating VASP server 140 and the user terminal 160 may simultaneously perform at least one of the operations described above with respect to FIGS. 2A to 4B and FIGS. 8 to 11. For example, the electronic device 100, the beneficiary VASP server 120, the originating VASP server 140 and the user terminal 160 may identify whether the hash value of the full name matches the hash value of the DOB as described with respect to FIG. 2A, and then identify whether the OTPs match as described with respect to FIG. 8. Alternatively, the electronic device 100, the beneficiary VASP server 120, the originating VASP server 140 and the user terminal 160 may identify whether the transaction identification values match as described with respect to FIG. 11, and then identify whether the hash value of the full name matches the hash value of the DOB as described with respect to FIG. 2B. In addition, the electronic device 100, the beneficiary VASP server 120, the originating VASP server 140 and the user terminal 160 may variously combine the operations described above with respect to FIGS. 2A to 4B and FIGS. 8 to 11, to verify a beneficiary or an originator.

Figure 12:
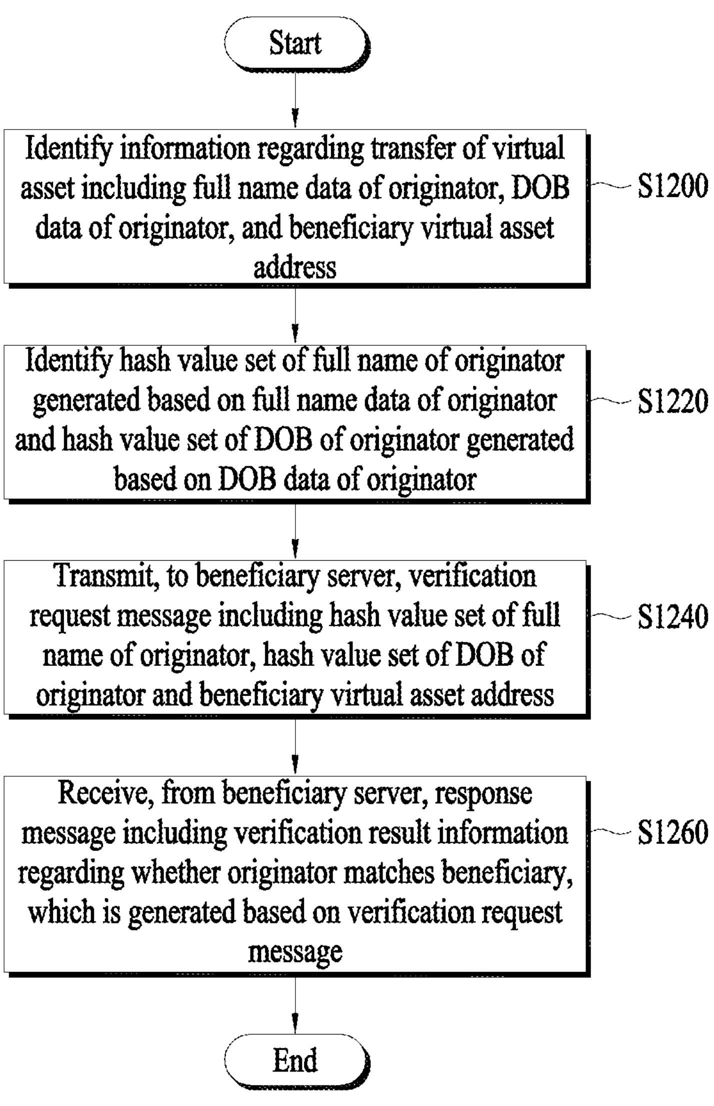
FIG. 12 is a flowchart of a method of verifying a beneficiary performed by an electronic device according to an example embodiment.

FIG. 12 is a flowchart of a method of verifying a beneficiary performed by an electronic device according to an example embodiment. For overlapping description, the above description may be applied.

In operation S1200, the electronic device may identify information regarding the transfer of a virtual asset including full name data of an originator, DOB data of the originator, and a beneficiary virtual asset address.

In operation S1220, the electronic device may identify a hash value set of a full name of the originator generated based on the full name data of the originator and a hash value set of a DOB of the originator generated based on the DOB data of the originator.

According to an example embodiment, when identifying the hash value set of the full name of the originator and the hash value set of the DOB of the originator, the electronic device may remove a configured character including a space from the full name data of the originator.

According to an example embodiment, when identifying the hash value set of the full name of the originator and the hash value set of the DOB of the originator, the electronic device may convert a letter case of a character included in the full name data of the originator into a configured case.

According to an example embodiment, the hash value set of the full name of the originator may include at least one among a first hash value generated based on the full name of the originator information consisting of a single entry in the order of first name and last name, a second hash value generated based on the full name of the originator information consisting of a single entry in the order of last name and first name, and a third hash value generated based on full name information of the originator composed of a plurality of entries including a last name, a first name and at least one middle name.

According to an example embodiment, the hash value set of the full name of the beneficiary generated based on the full name data of the beneficiary corresponding to the beneficiary virtual asset address may include at least one among a fourth hash value generated based on the full name information of the beneficiary composed of a single entry in the order of first name and last name, a fifth hash value generated based on the full name information of the beneficiary composed of a single entry in the order of last name and first name, and a six hash value generated based on full name information of the beneficiary composed of a plurality of entries including a last name, a first name and at least one middle name.

In operation S1240, to the beneficiary server, the electronic device may transmit a verification request message including a hash value set of the full name of the originator, a hash value set of the DOB of the originator and a beneficiary virtual asset address.

According to an example embodiment, the verification request message may further include at least one among a value representing the type of a verification target, a value representing the type of virtual asset, an auxiliary virtual asset address according to the virtual asset type, and a hash salt value related to at least one of the hash value set of the full name of the originator or the hash value set of the DOB of the originator.

In operation S1260, the electronic device may receive, from the beneficiary server, a response message including verification result information regarding whether the originator and the beneficiary match, which is generated based on the verification request message.

According to an example embodiment, based on the verification result information, it may be determined whether the virtual asset is performed from the originating virtual asset address of the originator to the beneficiary virtual asset address. For example, if the response message contains information indicating that the beneficiary is verified to match the originator, it may be determined that the transfer of the virtual asset is performed. Alternatively, if the response message contains one among information indicating that an address matching the beneficiary virtual asset address or an auxiliary virtual asset address is not identified among beneficiary virtual asset addresses related to the beneficiary server, information regarding a mismatch between the hash value set of the full name of the originator and the hash value set of the full name of the beneficiary generated based on the full name data of the beneficiary corresponding to the beneficiary virtual asset address, and information regarding the mismatch between a hash value set of the originator' DOB and a hash value set of the DOB of the beneficiary generated based on the DOB data of the beneficiary, it may be determined that the transfer of the virtual asset is blocked.

According to an example embodiment, the verification result information may include at least one of the information indicating that an address matching the beneficiary virtual asset address or an auxiliary virtual asset address is not identified among beneficiary virtual asset addresses related to the beneficiary server, the information regarding a mismatch between the hash value set of the full name of the originator and the hash value set of the full name of the beneficiary generated based on the full name data of the beneficiary corresponding to the beneficiary virtual asset address, information regarding the mismatch between a hash value set of the originator' DOB and a hash value set of the DOB of the beneficiary generated based on the DOB data of the beneficiary, or information indicating that the beneficiary is verified to match the originator.

According to an example embodiment, if any one hash value included in the hash value set of the full name of the beneficiary generated based on the full name data of the beneficiary corresponding to the beneficiary virtual asset address does not match any one of the first hash value, the second hash value and the third hash value, the verification result information may include information regarding the mismatch between the hash value set of the full name of the originator and the hash value set of the full name of the beneficiary.

According to an example embodiment, if any one hash value included in the hash value set of the full name of the originator does not match any one of the fourth hash value, the fifth hash value and the sixth hash value, the verification result information may include information regarding the mismatch between the hash value set of the full name of the originator and the hash value set of the full name of the beneficiary.

According to an example embodiment, with regard to the beneficiary virtual asset address, regardless of whether at least one character included in the beneficiary virtual asset address is a lowercase letter or an uppercase letter, it may be identified whether there is an address matching the beneficiary virtual asset address in the beneficiary server's database. Alternatively, with regard to the beneficiary virtual asset address, a configured prefix included in the beneficiary virtual asset address may be removed, and it may be identified whether there is an address matching the virtual asset address in the database of the beneficiary server.

Figure 13:
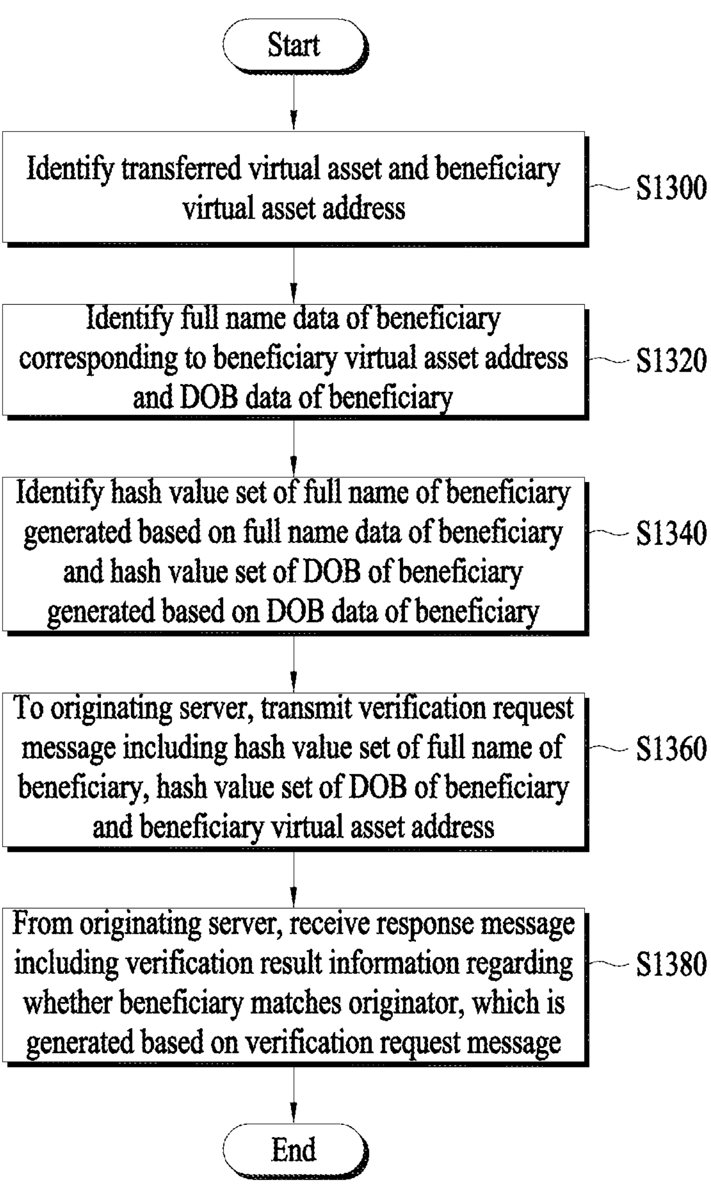
FIG. 13 is a flowchart of a method of verifying an originator performed by an electronic device according to an example embodiment.

FIG. 13 is a flowchart of a method of verifying an originator performed by an electronic device according to the example embodiment. For overlapping description, the above description may be applied.

In operation S1300, the electronic device may identify the transferred virtual asset and a beneficiary virtual asset address.

In operation S1320, the electronic device may identify full name data of the beneficiary and DOB data of the beneficiary corresponding to the beneficiary virtual asset address.

In operation S1340, the electronic device may identify a hash value set of the full name of the beneficiary generated based on the full name data of the beneficiary and a hash value set of the DOB of the beneficiary generated based on the DOB data of the beneficiary.

According to an example embodiment, when identifying the hash value set of the full name of the beneficiary and the hash value set of the DOB of the beneficiary, the electronic device may remove configured characters including spaces from the full name data of the beneficiary.

According to an example embodiment, when identifying the hash value set of the full name of the beneficiary and the hash value set of the DOB of the beneficiary, the electronic device may convert a letter case of characters included in the full name data of the beneficiary to a configured case.

According to an example embodiment, the hash value set of the full name of the beneficiary may include at least one of the first hash value generated based on full name information of the beneficiary composed of a single entry in order of first name and last name, the second hash value generated based on the full name information of the beneficiary composed of a single entry in the order of last name and first name, or the third hash value generated based on full name information of the beneficiary composed of a plurality of entries including a last name, a first name and at least one middle name.

According to an example embodiment, the hash value set of the full name of the originator corresponding to the beneficiary virtual asset address or the transaction identification value may include at least one among the fourth hash value generated based on the full name of the originator information consisting of a single entry in the order of first name and last name, the fifth hash value generated based on full name information of the originator consisting of a single entry in the order of last name and first name, and the sixth hash value generated based on full name information of the originator composed of a plurality of entries including a last name, a first name and at least one middle name.

In operation S1360, the electronic device may transmit a verification request message including a hash value set of full name of the beneficiary, a hash value set of DOB of the beneficiary and a beneficiary virtual asset address to an originating server.

According to an example embodiment, the verification request message may further include at least one of a transaction identification value corresponding to the transfer of the virtual asset, a value indicating the type of a verification target, a value indicating the type of virtual asset to be transferred, an auxiliary virtual asset address according to the type of virtual asset, or a hash salt value related to at least one of a hash value set of full name of the beneficiary or a hash value set of the DOB of the beneficiary.

In operation S1380, the electronic device may receive a response message including verification result information regarding whether the beneficiary and the originator match, which is generated based on the verification request message, from the originating server.

According to an example embodiment, the verification result information may include one of information indicating that a value matching the transaction identification value is not identified among transaction identification values related to the originating server, information indicating that an address matching the beneficiary virtual asset address or the auxiliary virtual asset address is not identified among virtual asset addresses related to the originating server, information regarding a mismatch between the hash value set of the full name of the beneficiary and the hash value set of the full name of the originator generated based on the full name data of the originator corresponding to the beneficiary virtual asset address or the transaction identification value, information regarding the mismatch between the hash value set of DOB of beneficiary and the hash value set of DOB of originator generated based on DOB data of originator, and information indicating that the originator is verified to match the beneficiary.

According to an example embodiment, if a hash value of any one of the hash value set of the full name of the originator corresponding to the beneficiary virtual asset address or the transaction identification value does not match any one hash value of the first hash value, the second hash value and the third hash value, the verification result information may include information regarding a mismatch between the hash value set of the full name of the beneficiary and the hash value set of the full name of the originator.

According to an example embodiment, if a hash value of any one of the hash value set of the full name of the beneficiary does not match any one hash value of the fourth hash value, the fifth hash value and the sixth hash value, the verification result information may include information regarding a mismatch between the hash value set of the full name of the beneficiary and the hash value set of the full name of the originator.

According to an example embodiment, if the verification result information includes information indicating that the originator is verified to match the beneficiary, based on the transaction identification value, the virtual asset may be reflected in the balance of the beneficiary virtual asset address at every configured time.

According to an example embodiment, with regard to the beneficiary virtual asset address, regardless of whether at least one character included in the beneficiary virtual asset address is a lowercase letter or an uppercase letter, it may be identified whether there is an address matching the beneficiary virtual asset address in the database of the originating server. Alternatively, with regard to the beneficiary virtual asset address, a configured prefix included in the beneficiary virtual asset address may be removed, and it may be identified whether there is an address matching the beneficiary virtual asset address in the database of the originating server.

According to an example embodiment, with regard to the transaction identification value, regardless of whether at least one character in the transaction identification value is a lowercase or an uppercase letter, it may be identified that there is a value matching the transaction identification value in the database of the originating server. Alternatively, with regard to the transaction identification value, if the type of the transaction identification value includes an identifier type and a hash value type, using the transaction identification value of the hash value type, it may be determined whether there is a value matching the transaction identification value in the database of the originating server. With regard to the transaction identification value, using the transaction identification value including a value of a leading zero, it may be identified whether there is a value matching the transaction identification value in the database of the originating server.

Figure 14:
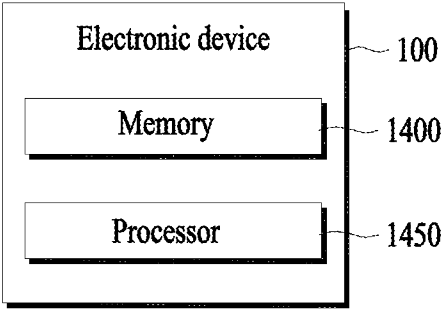
FIG. 14 is a block diagram of an electronic device according to an example embodiment.

FIG. 14 is a block diagram of the electronic device 100 according to the example embodiment.

According to the example embodiment, the electronic device 100 may include a memory 1400 and one or more processors 1450. In the electronic device 100 illustrated in FIG. 14, only elements related to the example embodiments are illustrated. Therefore, those skilled in the art may understand that other general-purpose elements may be further included in addition to the elements illustrated in FIG. 14.

For example, according to an example embodiment, the electronic device may include a communication device (not illustrated). The communication device is a device for performing wired/wireless communication, and may communicate with an external electronic device. An external electronic device may be a terminal or a server. Further, the communication technology used by the communication device may include Global System for Mobile communication (GSM), Code Division Multi Access (CDMA), Long Term Evolution (LTE), 5G, Wireless LAN (WLAN), and Wireless-Fidelity (Wi-Fi), Bluetooth, Radio Frequency Identification (RFID), Infrared Data Association (IrDA), ZigBee, and Near Field Communication (NFC).

One or more processors 1450 may control overall operations of the electronic device 100 and process data and signals. One or more processors 1450 may be composed of at least one hardware unit. Further, the one or more processors 1450 may operate by one or more software modules generated by executing one or more instructions stored in the memory 1400.

One or more processor 1450 may be set to identify information regarding transfer of the virtual asset including full name data or an originator, DOB data of the originator and a beneficiary virtual asset address, identify a hash value set of the full name of the originator generated based on the full name data of the originator and a hash value set of the DOB of the originator generated based on the DOB data of the originator, transmit a verification request message including a hash value set of the full name of the originator, a hash value set of the DOB of the originator and the beneficiary virtual asset address to the beneficiary server, and receive a response message including verification result information generated based on the verification request message from the beneficiary server.

One or more processors 1450 may be set to identify the transferred virtual asset and a beneficiary virtual asset address, identify the full name data of the beneficiary and the DOB data of the beneficiary corresponding to the beneficiary virtual asset address, identify a hash value set of the full name of the beneficiary generated based on the full name data of the beneficiary and a hash value set of the DOB of the beneficiary generated based on the DOB data of the beneficiary, transmit a verification request message including the hash value set of the full name of the beneficiary, the hash value set of the DOB of the beneficiary, and the beneficiary virtual asset address to the originating server, and receive a response message including the verification result information generated based on the verification request message from the originating server.

The electronic device according to the above-described example embodiments may include a processor, a memory for storing and executing program data, a permanent storage such as a disk drive, and/or a user interface device such as a communication port, a touch panel, a key and/or a button that communicates with an external device. Methods implemented as software modules or algorithms may be stored in a computer-readable recording medium as computer-readable codes or program instructions executable on the processor. Here, the computer-readable recording medium includes a magnetic storage medium (for example, ROMs, RAMs, floppy disks and hard disks) and an optically readable medium (for example, CD-ROMs and DVDs). The computer-readable recording medium may be distributed among network-connected computer systems, so that the computer-readable codes may be stored and executed in a distributed manner. The medium may be readable by a computer, stored in a memory, and executed on a processer.

The example embodiments may be represented by functional block elements and various processing steps. The functional blocks may be implemented in any number of hardware and/or software configurations that perform specific functions. For example, an example embodiment may adopt integrated circuit configurations, such as memory, processing, logic and/or look-up table, that may execute various functions by the control of one or more microprocessors or other control devices. Similar to that elements may be implemented as software programming or software elements, the example embodiments may be implemented in a programming or scripting language such as C, C++, Java, assembler, etc., including various algorithms implemented as a combination of data structures, processes, routines, or other programming constructs. Functional aspects may be implemented in an algorithm running on one or more processors. Further, the example embodiments may adopt the existing art for electronic environment setting, signal processing, and/or data processing. Terms such as "mechanism," "element," "means" and "configuration" may be used broadly and are not limited to mechanical and physical elements. The terms may include the meaning of a series of routines of software in association with a processor or the like.

The above-described example embodiments are merely examples, and other embodiments may be implemented within the scope of the claims to be described later.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of verifying a beneficiary performed by an electronic device, comprising:

identifying information regarding transfer of a virtual asset including personal identifiable information of an originator and a beneficiary virtual asset address;

identifying a hash value set of the personal identifiable information of the originator generated based on the personal identifiable information of the originator;

transmitting, to a beneficiary server, a verification request message including the hash value set of the personal identifiable information of the originator and the beneficiary virtual asset address; and receiving, from the beneficiary server, a response message including verification result information regarding whether the originator matches the beneficiary, which is generated based on the verification request message, wherein, based on the verification result information, whether to transfer the virtual asset from an originating virtual asset address of the originator to the beneficiary virtual asset address is determinable, wherein the verification request message further includes at least one of:

a value representing a type of the virtual asset;

a value representing a type of a verification target;

an auxiliary virtual asset address according to the type of the virtual asset; or a hash salt value related to the hash value set of the personal identifiable information of the originator;

wherein the verification result information includes at least one of:

information indicating that an address matching the beneficiary virtual asset address or the auxiliary virtual asset address is not identified from among virtual asset addresses related to the beneficiary server;

information regarding a mismatch between the hash value set of the personal identifiable information of the originator and a hash value set of personal identifiable information of the beneficiary generated based on the personal identifiable information of the beneficiary corresponding to the beneficiary virtual asset address; or information indicating that the beneficiary is verified to match the originator, wherein in case that the response message includes the information indicating that the beneficiary is verified to match the originator, it is determined to perform the transfer of the virtual asset, and wherein in case that the response message includes one from among the information indicating that an address matching the beneficiary virtual asset address or the auxiliary virtual asset address is not identified from among virtual asset addresses related to the beneficiary server or the information regarding the mismatch between the hash value set of the personal identifiable information of the originator and the hash value set of the personal identifiable information of the beneficiary, it is determined to block the transfer of the virtual asset.

2. The method of claim 1, wherein the personal identifiable information of the originator includes full name data of the originator, and wherein the identifying of the hash value set of the personal identifiable information comprises:

removing a space from the full name data of the originator; and generating a hash value set of a full name of the originator based on the full name data of the originator from which the space is removed.

3. The method of claim 1, wherein the personal identifiable information of the originator includes full name data of the originator, and wherein the identifying of the hash value set of the personal identifiable information comprises:

changing a letter case of a character included in the full name data of the originator into a configured letter case; and generating a hash value set of a full name of the originator based on the full name data of the originator including the character changed to the configured letter case.

4. The method of claim 1, wherein the personal identifiable information of the originator includes full name data of the originator, wherein the identifying of the hash value set of the personal identifiable information of the originator comprises identifying a hash value set of a full name of the originator generated based on the full name data of the originator, wherein the hash value set of the full name of the originator further includes at least one of:

a first hash value generated based on full name information of the originator consisting of a single entry in an order of first name and last name;

a second hash value generated based on full name information of the originator consisting of a single entry in an order of the last name and the first name; or a third hash value generated based on full name information of the originator consisting of a plurality of entries including the last name, the first name and at least one of middle name.

5. The method of claim 4, wherein the verification result information includes, in case that any one hash value included in a hash value set of a full name of the beneficiary generated based on full name data of the beneficiary corresponding to the beneficiary virtual asset address does not match any one hash value of the first hash value, the second hash value and the third hash value, information regarding a mismatch between the hash value set of the full name of the originator and the hash value set of the full name of the beneficiary.

6. The method of claim 1, wherein, with regard to the beneficiary virtual asset address, regardless of whether at least one character included in the beneficiary virtual asset address is a lowercase letter or an uppercase letter, it is identified whether there is an address matching the beneficiary virtual asset address in database of the beneficiary server.

7. The method of claim 1, wherein, with regard to the beneficiary virtual asset address:

a configured prefix included in the beneficiary virtual asset address is removed; and it is identified whether there is an address matching the beneficiary virtual asset address in database of the beneficiary server.

8. The method of claim 1, wherein the personal identifiable information of the originator includes at least one of:

full name data of the originator;

date of birth (DOB) data of the originator; or mobile phone number data of the originator.

9. A computer-readable non-transitory recording medium having a program for executing a method of claim 1 on a computer.

10. A method of verifying an originator performed by an electronic device, comprising:

identifying a transferred virtual asset and a beneficiary virtual asset address;

identifying personal identifiable information of a beneficiary corresponding to the beneficiary virtual asset address;

identifying a hash value set of the personal identifiable information of the beneficiary generated based on the personal identifiable information of the beneficiary;

transmitting to an originating server, a verification request message including the hash value set of the personal identifiable information of the beneficiary and the beneficiary virtual asset address; and receiving, from the originating server, a response message including verification result information regarding whether the beneficiary matches the originator, which is generated based on the verification request message, wherein the verification request message further includes at least one of:

a value representing a type of the virtual asset;

a value representing a type of a verification target;

an auxiliary virtual asset address according to the type of the virtual asset; or a hash salt value related to the hash value set of the personal identifiable information of the originator;;

wherein the verification result information includes at least one of:

information indicating that an address matching the beneficiary virtual asset address or the auxiliary virtual asset address is not identified from among virtual asset addresses related to the beneficiary server;

information regarding a mismatch between the hash value set of the personal identifiable information of the originator and a hash value set of personal identifiable information of the beneficiary generated based on the personal identifiable information of the beneficiary corresponding to the beneficiary virtual asset address; or information indicating that the beneficiary is verified to match the originator, and wherein, in case that the verification result information includes the information indicating that the beneficiary is verified to match the originator, it is determined to perform the transfer of the virtual asset, and wherein in case that the response message includes one from among the information indicating that an address matching the beneficiary virtual asset address or the auxiliary virtual asset address is not identified from among virtual asset addresses related to the beneficiary server or the information regarding the mismatch between the hash value set of the personal identifiable information of the originator and the hash value set of the personal identifiable information of the beneficiary, it is determined to block the transfer of the virtual asset.

11. The method of claim 10, wherein, with regard to the transaction identification value, regardless of whether at least one character included in the transaction identification value is a lowercase letter or an uppercase letter, it is identified whether there is a value matching the transaction identification value in database of the originating server.

12. The method of claim 10, wherein, with regard to the transaction identification value, in case that a type of the transaction identification value includes an identifier type and a hash value type, it is identified, using the transaction identification value of the hash value type, whether there is a value matching the transaction identification value in database of the originating server.

13. The method of claim 10, wherein the personal identifiable information of the beneficiary includes at least one of:

full name data of the beneficiary;

DOB data of the beneficiary; or mobile phone number data of the beneficiary.

14. An electronic device, comprising:

one or more processors; and a memory for storing one or more instructions executed by the one or more processor, wherein the one or more processors, by executing the one or more instructions, are configured to:

identify information regarding transfer of a virtual asset including personal identifiable information of an originator and a beneficiary virtual asset address;

identify a hash value set of the personal identifiable information of the originator generated based on the personal identifiable information of the originator;

transmit, to a beneficiary server, a verification request message including the hash value set of the personal identifiable information of the originator and the beneficiary virtual asset address; and receive, from the beneficiary server, a response message including verification result information regarding whether the originator matches the beneficiary, which is generated based on the verification request message, wherein, based on the verification result information, whether to transfer the virtual asset from an originating virtual asset address of the originator to the beneficiary virtual asset address is determined, wherein the verification request message further includes at least one of:

a value representing a type of the virtual asset;

a value representing a type of a verification target;

an auxiliary virtual asset address according to the type of the virtual asset; or a hash salt value related to the hash value set of the personal identifiable information of the originator;;

wherein the verification result information includes at least one of:

information indicating that an address matching the beneficiary virtual asset address or the auxiliary virtual asset address is not identified from among virtual asset addresses related to the beneficiary server;

information regarding a mismatch between the hash value set of the personal identifiable information of the originator and a hash value set of personal identifiable information of the beneficiary generated based on the personal identifiable information of the beneficiary corresponding to the beneficiary virtual asset address; or information indicating that the beneficiary is verified to match the originator, wherein in case that the response message includes the information indicating that the beneficiary is verified to match the originator, it is determined to perform the transfer of the virtual asset, and wherein in case that the response message includes one from among the information indicating that an address matching the beneficiary virtual asset address or the auxiliary virtual asset address is not identified from among virtual asset addresses related to the beneficiary server or the information regarding the mismatch between the hash value set of the personal identifiable information of the originator and the hash value set of the personal identifiable information of the beneficiary, it is determined to block the transfer of the virtual asset.

* * * * *